(12) United States Patent
Stange et al.

(10) Patent No.: US 10,285,344 B2
(45) Date of Patent: May 14, 2019

(54) IRRIGATION CONTROLLER WITH REVERSIBLE OPERATOR CONTROLS

(71) Applicant: HUNTER INDUSTRIES, INC., San Marcos, CA (US)

(72) Inventors: Richard C. Stange, Oceanside, CA (US); Thomas C. Kadien, Vista, CA (US); Steven B. Cook, Oceanside, CA (US); Kok Huat Chong, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 253 days.

(21) Appl. No.: 15/267,893

(22) Filed: Sep. 16, 2016

(65) Prior Publication Data

US 2018/0077880 A1   Mar. 22, 2018

(51) Int. Cl.
*G05B 15/02* (2006.01)
*A01G 25/16* (2006.01)

(52) U.S. Cl.
CPC ............ *A01G 25/16* (2013.01); *G05B 15/02* (2013.01); *G05B 2219/2625* (2013.01)

(58) Field of Classification Search
CPC . A01G 25/16; G05B 15/02; G05B 2219/2625
USPC ........................................................ 700/284
See application file for complete search history.

(56) References Cited

U.S. PATENT DOCUMENTS

| | | | |
|---|---|---|---|
| 7,069,115 B1* | 6/2006 | Woytowitz | A01G 25/16 137/78.3 |
| 7,457,687 B1* | 11/2008 | Porter | A01G 25/165 137/624.11 |
| 7,953,517 B1* | 5/2011 | Porter | A01G 25/165 700/284 |
| 8,498,099 B1* | 7/2013 | Schmuckle | H05K 5/0017 174/50 |
| 9,970,666 B2* | 5/2018 | Son | F24F 13/04 |
| 2005/0071290 A1* | 3/2005 | Brooks, Jr. | G07B 17/00193 705/401 |
| 2006/0030971 A1* | 2/2006 | Nelson | A01G 25/165 700/284 |
| 2006/0168611 A1* | 7/2006 | Fima | E03B 1/00 725/10 |
| 2008/0058964 A1* | 3/2008 | Nickerson | A01G 25/16 700/19 |
| 2010/0030476 A1* | 2/2010 | Woytowitz | A01G 25/16 702/3 |

(Continued)

*Primary Examiner* — Jason D Mitchell
(74) *Attorney, Agent, or Firm* — Knobbe, Martens, Olson & Bear, LLP

(57) ABSTRACT

An irrigation controller comprises actuable controls, a memory to store the watering program, and one or more displays. The actuable controls and display are incorporated into a removable face pack that is mounted to an interior door of the irrigation controller. The face pack can be easily moved from a first position on the front side of the interior door to a second position on the back side of the interior door and the face pack automatically senses its position. When the face pack is in the first position, the actuable controls and display are configured for operating information. When the face pack is in the second position, the wiring hook up area of the irrigation controller is exposed and the actuable controls and display are configured for diagnostics.

20 Claims, 35 Drawing Sheets

(56) References Cited

U.S. PATENT DOCUMENTS

| | | | | |
|---|---|---|---|---|
| 2010/0206204 | A1* | 8/2010 | Shimizu | D05B 39/00 112/102.5 |
| 2011/0181435 | A1* | 7/2011 | Sata | G06F 1/26 340/815.4 |
| 2012/0274219 | A1* | 11/2012 | Woytowitz | H05K 5/0017 315/152 |
| 2013/0088333 | A1* | 4/2013 | Song | H04N 21/418 340/10.1 |
| 2014/0146085 | A1* | 5/2014 | Takeda | G06F 1/1632 345/648 |
| 2014/0365701 | A1* | 12/2014 | Naruse | G06F 1/1632 710/304 |
| 2015/0159401 | A1* | 6/2015 | Patrick | G07C 9/00571 292/137 |
| 2015/0163412 | A1* | 6/2015 | Holley | G05B 15/02 348/143 |

* cited by examiner

2500

| System: Running | | | | Stop |
|---|---|---|---|---|
| Station | Pgm | Mode | Remaining | |
| 1 | --- | Manual | 00:29:49 | Manual |
| P/MV3 | --- | Manual | 00:19:51 | |
| 5 | --- | Manual | 00:14:52 | View Flow |
| 05:47:08PM Friday, 8/12/1216 | | | | Main Menu |

| Module Info | | Click Sensor Diagnostics |
|---|---|---|
| Face Pack | 0.2900 A | |
| Power Module | 0.08.004 b | Station Diagnostics |
| Station Modules: | | |
| Slot 01 | 0.05.004 b | |
| Slot 02 | 0.05.005 b | Flow Sensor Diagnostics |
| Slot 03 | Not Present | |
| Slot 04 | Not Present | |
| Slot 05 | Not Present | Solar Sync Diagnostics |
| Slot 06 | Not Present | |
| Slot 07 | Not Present | |

| Click Sensor Diagnostics | | | Setup Click Sensor |
|---|---|---|---|
| Sensor | State | In Use? | |
| 1. Rain Click | Delayed 72 Hours remaining | No | |
| 2. Freeze Sensor | Active | No | |
| 3. Click Sensor | Disabled | No | |

| Flow Sensor Diagnostics | | | | Setup Flow Sensor |
|---|---|---|---|---|
| Number | Sensor Type | Flow Rate | Frequency | |
| 1 | HFS FCT-100 | 9.8 GPM | 22 Hz | |
| 2 | HFS FCT-200 | 19 GPM | 9 Hz | |
| 3 | HFS FCT-300 | 29 GPM | 4 Hz | |
| Flow Module Installed: Yes | | | | |
| Number | Sensor Type | Flow Rate | Frequency | |
| 4 | Custom | 50 GPM | 6 Hz | |
| 5 | ---- | ---- | ---- | |
| 6 | HFS FCT-150 | 29 GPM | 44 Hz | |

| Solar Sync Diagnostics | | | Setup Solar Sync |
|---|---|---|---|
| Connection Type: Wired | | | |
| Last Data Rx: Aug. 12,2016 04:45:15PM | | | |
| Sensor | State | In Use? | |
| Solar Sync Rain | Active | No | |
| Solar Sync Freeze | Inactive | No | |
| Connection Test: PASSED | | | Test Connection |

| Station - P/MV Diagnostics | | P/MV Operation |
|---|---|---|
| Transformer Output: 26.0VAC 560mA | | |
| Active Station-P/MV | Current Draw | Station Setup |
| P/MV 1 | 701mA | |
| P/MV 2 | 702mA | |
| 1. Front Lawn | 201mA | |
| 2. Garden | 201mA | |
| 3. Station 3 | 201mA | |

| Time/Date | |
|---|---|
| Current Time 12:16AM  Day of Week | |
| Current Date Dec 10  2015  Thu | |
| Daylight Saving Time | |
| ☒ Automatically adjust for DST | |
| DST Switch time | |
| DST Begins on 2nd Sun of March | |
| DST ends on 1st Sun of November | |

FIG. 31

IRRIGATION CONTROLLER WITH REVERSIBLE OPERATOR CONTROLS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

The invention relates to electronic controllers that control valves which supply water to sprinklers that irrigate turf, agriculture, and landscaping.

In many parts of the world due to inadequate rainfall it is necessary at certain times during the year to artificially water crops, turf, and landscaping. An ideal irrigation system for crops, turf, and landscaping should utilize valves, supply lines, and sprinklers. Preferably the valves should be turned ON and OFF by a reliable electronic irrigation controller that is easy to program and can carry out a wide variety of watering schedules. The goal is to uniformly distribute the optimum amount of water over a given area. The type, placement, and flow rates for each of the sprinklers are pre-selected when an irrigation system is designed and/or installed. The amount of water supplied by each sprinkler is largely determined by the size and configuration of its nozzle orifice(s), and water pressure that is supplied to the sprinkler.

Landscape irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone.

SUMMARY OF THE INVENTION

Certain embodiments relate to an irrigation controller that comprises a plurality of manually actuable controls for entry or selection of a watering program, a memory for storing the watering program, and one or more displays to provide instructions and feedback for programming and maintaining the irrigation system. The actuable controls and display are incorporated into a movable face pack that is mounted relative to an interior hinge of the irrigation controller. The face pack can be stored in a first position covering a wiring hook up area and swung open on the hinge to a second position to expose the wiring hookup area. The controls and display of the face pack can be viewed when the face pack is in its first position and moved to a second orientation relative to the hinge to be viewed while it is in the second position with the wiring hook up area exposed. The face pack may be able to automatically sense when it is in the first or second position and display a user home screen in the first position and a system diagnostic screen in the second position.

Some embodiments relate to an irrigation controller comprising a plurality of manually actuable controls configured to accept user input for entry or selection of a watering program, a memory configured to store the watering program and one or more displays configured to display instructions and feedback for programming and maintaining an irrigation system. The plurality of actuable controls and the one or more displays are incorporated into a movable face pack that is mounted relative to an interior hinge of the irrigation controller. The face pack is configured to cover a wiring hook up area when placed in a first position relative to the interior hinge and further configured to expose the wiring hookup area when placed in a second position relative to the interior hinge. The plurality of manually actuable controls and the one or more displays are viewable to a user when the face pack is in the first position and when the face pack is in the second position, and the face pack is further configured to display a home screen on the one or more displays when in the first position and to display a diagnostic screen on the one or more displays when in the second position.

In accordance with some embodiments, an irrigation controller comprises a plurality of manually actuable controls for entry or selection of a watering program, a memory for storing the watering program, and one or more displays to provide instructions and feedback for programming and maintaining the irrigation system. The actuable controls and display are incorporated into a removable face pack that is mounted to an interior door of the irrigation controller. The face pack can be easily moved from a first position on the front side of the door to a second position on a back side of the door. The face pack may be able to automatically sense when it is in the first or second position and display a user home screen in the first position and a system diagnostic screen second in the second position.

In accordance with other embodiments, an irrigation controller comprises a plurality of manually actuable controls for entry or selection of a watering program, a memory for storing the watering program, and one or more displays to provide instructions and feedback for programming and maintaining the irrigation system, where the plurality of actuable controls and the one or more displays are incorporated into a removable face pack that is removably mounted to an interior door of the irrigation controller, the face pack is configured to move from a first position on the front side of the interior door to a second position on a back side of the interior door, and the face pack further configured to automatically display a home screen when in the first position and to automatically display a diagnostic screen when in the second position.

Certain embodiments relate to a method of interfacing with an irrigation controller where a user can view a home screen, other programming, reporting, and/or diagnostic screens from an operator interface when the operator interface is mounted to the front side of a moveable panel in the irrigation controller. The user can reposition the operator interface from the front side of the movable panel to the back side of the moveable panel when the moveable panel is opened and the user interface automatically displays a diagnostic screen.

In another aspect, an irrigation controller to control an irrigation system is disclosed. The irrigation controller comprises a face pack comprising one or more actuable controls configured to enable a user to enter or select a watering program and at least one display configured to display instructions and feedback to program and maintain the irrigation system, where the one or more actuable controls and the at least one display are located on a front surface of the face pack. The irrigation controller further comprises an interior door that is configured to cover a wiring hookup area and to rotate on a hinge to expose the wiring hookup area. The face pack being is removably mounted onto the interior door. The face pack is configured to be placed in a first orientation relative to the interior door when the wiring hookup area is covered, and the front surface is viewable when the face pack is in the first orientation. The face pack is further configured to be moved to a second orientation relative to the interior door when the wiring hookup area is exposed, and the front surface is viewable when the face pack is in the second orientation.

In an embodiment, the face pack is further configured to provide a home screen to the at least one display when the face pack is in the first orientation. In another embodiment, the face pack is further configured to provide a diagnostic screen to the at least one display when the face pack is in the second orientation. In a further embodiment, the irrigation controller further comprises a memory configured to store the watering program, and a processor operatively connected to the memory, the one or more actuable controls, and the at least one display, where the processor is configured to execute programming stored in the memory, receive user inputs from the one or more actuable controls, and provide a plurality of display screens having the instructions and the feedback. In a yet further embodiment, the face pack further comprises the memory and the processor.

In an embodiment, the processor is further configured to provide a home screen to the at least one display when the face pack is in the first orientation and to provide a diagnostic screen to the at least one display when the face pack is in the second orientation. In another embodiment, the interior door comprises a magnet and the face pack further comprises a magnetically actuating device having a first state and a second state. In a further embodiment, the magnetically actuating device is in the first state when the face pack is in the first orientation and the magnetically actuating device is in the second state when the face pack is in the second orientation. In a yet further embodiment, the magnetically actuating device comprises a magnetically actuating switch, and the instructions and the feedback displayed on the at least one display are based on a position of the magnetically actuating switch.

Certain embodiments relate to an irrigation controller to control an irrigation system. The irrigation controller comprises a housing configured to house the irrigation controller, where the housing comprises an interior door that is configured to rotate about an interior hinge, memory configured to store a watering program, and a removable face pack comprising a plurality of manually actuable controls configured to permit a user to enter or select the watering program and at least one display configured to provide instructions and feedback for programming and maintaining the irrigation system, and a plurality of receptacles that are covered when the interior door is closed and exposed when the interior door is open. Each receptacle of the plurality of receptacles is configured to accept a corresponding output module that is enabled according to the watering program to permit a flow of water to an irrigation area. The removable face pack is configured to be placed in a first position on a front side of the interior door when the plurality of receptacles are covered and to be placed in a second position on a back side of the interior door when the plurality of receptacles are exposed. The removable face pack is further configured to display a user home screen on the at least one display when in the first position and to display a system diagnostic screen on the at least one display when in the second position.

In an embodiment, the plurality of manually actuable controls and the at least one display are viewable to the user when the removable face pack is in the first and second positions. In another embodiment, the removable face pack further comprises a magnetically actuable device having an actuated state and an unactuated state, and the interior door comprises a magnet. In a further embodiment, the removable face pack displays the user home screen when the magnetically actuable device is in one of the actuated state and the unactuated state, and displays the system diagnostic screen when the magnetically actuated device is in the other of the actuated state and the unactuated state.

In an embodiment, the magnetically actuable device comprises a reed switch. In another embodiment, at least one of the plurality of manually actuable controls has a first function when the home screen is displayed and a second function different from the first function when the system diagnostic screen is displayed. In a further embodiment, the housing further comprises a first edge having a first radiused portion and a front door that is configured to rotate in relation to the housing between an open position and a closed position. The front door comprises a second edge having a second radiused portion that fits over the first radiused portion when the front door is in the closed position.

Certain embodiments relate to a method to interface with an irrigation controller. The method comprises receiving, with computer hardware comprising one or more computer processors, an indication indicating one of an operator interface device mounted to a front side of a moveable panel in the irrigation controller and the operator interface device mounted to a back side of the moveable panel, where the operator interface device comprises one or more actuable controls configured to enable a user to enter or select a watering program and at least one display configured to display instructions and feedback to program and maintain an irrigation system. The one or more actuable controls and the at least one display are located on a first side of the operator interface device, and the operator interface device is repositionable between the front side and the back side of the moveable panel. The method further comprises displaying a home screen on the at least one display when the moveable panel covers a wiring hookup area and the operator interface device is mounted to the front side of the moveable panel, where the home screen provides irrigation control information, and displaying a diagnostic screen on the at least one display when the wiring hookup area is exposed and the operator interface device is mounted to the back side of the moveable panel, where the diagnostic screen provides diagnostic information associated with a configuration of the wiring hookup area. The first side of the operator interface device is viewable to the user when the operator interface device is mounted to the front side of the moveable panel and viewable to the user when the operator interface device is mounted to the back side of the moveable panel.

In an embodiment, the movable panel is configured to cover the wiring hookup area when in a closed position and configured to expose the wiring hookup area when in an open position. In another embodiment, the method further comprises actuating a magnetically actuable switch located in the operator interface device with a magnet located in the moveable panel when the wire hookup area is covered. In a further embodiment, the method further comprises generating the indication based on a state of a magnetically actuable switch.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments and not to limit the scope of the disclosure.

FIG. 25 illustrates an exemplary home screen for an irrigation controller, according to certain embodiments.

FIGS. 26-30 illustrate exemplary diagnostic screens for an irrigation controller, according to certain embodiments.

FIG. 31 illustrates an exemplary data screen for an irrigation controller, according to certain embodiments.

DETAILED DESCRIPTION

Figure 1:
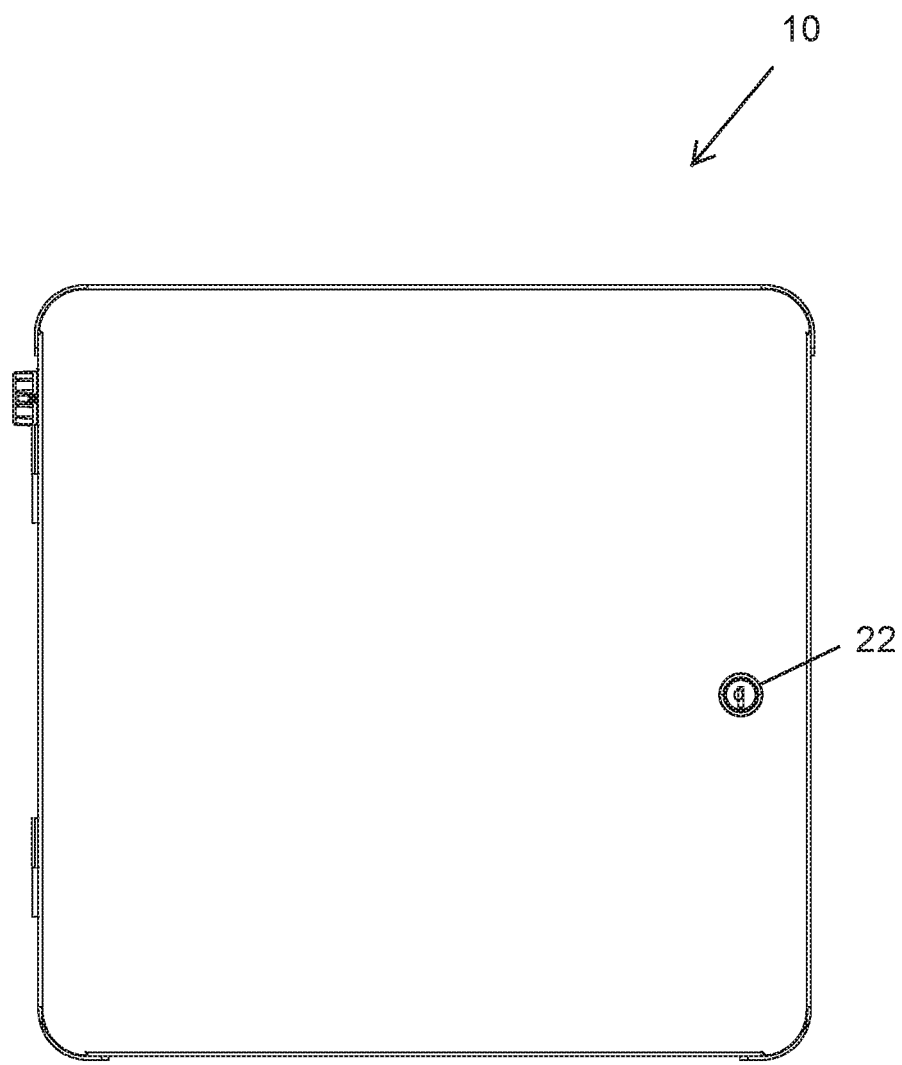
FIG. 1 illustrates an exemplary irrigation controller, according to certain embodiments.

A modern electronic irrigation controller typically includes a microprocessor that executes one or more watering programs. The watering programs can be pre-programmed by the user via push buttons and/or rotary controls. The controller usually has an LCD or other display to facilitate programming by the user. Often the controller will include an EEPROM memory to maintain the watering program in the case of a power failure. The microprocessor controls the solenoid valves via suitable drivers and switching devices. The valves are opened and closed by the microprocessor in accordance with the pre-programmed run and cycle times for each of the stations.

Electronic irrigation controllers have gained increasing popularity. In these controllers, the base portion of the system contains the microprocessor and user actuated controls. Often the microprocessor and user actuated controls are in the form a user interface panel, which is often called a face pack. The face pack of many controllers is in a hinged portion so the user can see the face pack for normal programming, yet this hinged portion can be opened to allow access to the wiring hook up area of the irrigation controller. The wiring hook up area often includes a transformer or other power supply as well as a variety of modules or terminals for connecting to a variety of sensors as well as control wires to operate the irrigation valves.

Each station is often controlled by a corresponding station module which typically comprises a plastic housing that encloses and supports a station module circuit, as well as wire connection terminals for connecting wires to a plurality of solenoid actuated valves. Usually each station module circuit includes a plurality of triacs or other AC switching devices and can independently control a plurality of solenoid actuated valves, i.e., stations. The station modules contain pins, sockets, card edge connectors or some other standard form of connectors for allowing them to be inserted into slots or receptacles in either the housing that contains the microprocessor or a separate back panel hinged to the microprocessor housing. When the station modules are plugged into a modular expandable irrigation controller, they are mechanically supported and an electrical connection is made between the microprocessor and the driver. See for example, U.S. Pat. No. 6,721,630 B1 of Peter J. Woytowitz, assigned to Hunter Industries, Inc., the assignee of the present application. Some irrigation controllers have a fixed number of station terminals built into the controller and they do not have the station modules. Some irrigation controllers use a combination of fixed terminals plus expansion modules.

The advantage of an irrigation controller with a modular expandable configuration is that the controller need only be equipped with the minimum number of station modules that can control the total number of stations needed. Thus, for example, an irrigation system may have six zones, requiring only a single station module, while another may have fifty stations which might require nine station modules. Considerable cost savings are thus achieved. Moreover, if an irrigation system expands after initial installation because the landscaping has increased, additional station modules can be plugged into the controller. The station modules can also be removed and replaced if damaged, for example, during a lightning strike. In some modular expandable irrigation systems the base unit is capable of controlling a minimal number of stations without requiring the addition of any station modules. In others, such as the ProC™ irrigation controller manufactured and sold by Hunter Industries, Inc., at least a power module and one irrigation station module are plugged into the controller in order to operate any stations or zones.

Various manufacturers commercially produce modular expandable irrigation controllers. While the input controls and processor circuitry in these products vary in terms of their functional capabilities, the station modules do not. Conventional station modules include a type of AC switch, such as a triac, along with a circuit that can interpret commands from a microprocessor and drive the AC switch to the appropriate state. Some conventional station modules also include surge suppression components such as metal oxide varistors, gas tubes, or inductors.

Some conventional modular expandable irrigation controllers also provide multiple sensor interfaces, network communications, and flow sensing capabilities.

U.S. Pat. No. 6,721,630 B1 granted Apr. 13, 2004 to Peter J. Woytowitz entitled "EXPANDALE IRRIGATION CONTROLLER WITH OPTIONAL HIGH DENSITY STATION MODULE", and U.S. Pat. No. 7,245,991 B1 granted Jul. 17, 2007 to Peter J. Woytowitz entitled "DISTRIBUTED ARCHITECTURE IRRIGATION CONTROLLER" are hereby incorporated herein by reference in their entireties. The aforementioned patents are assigned to Hunter Industries, Inc., the assignee of the subject application.

Figure 2:
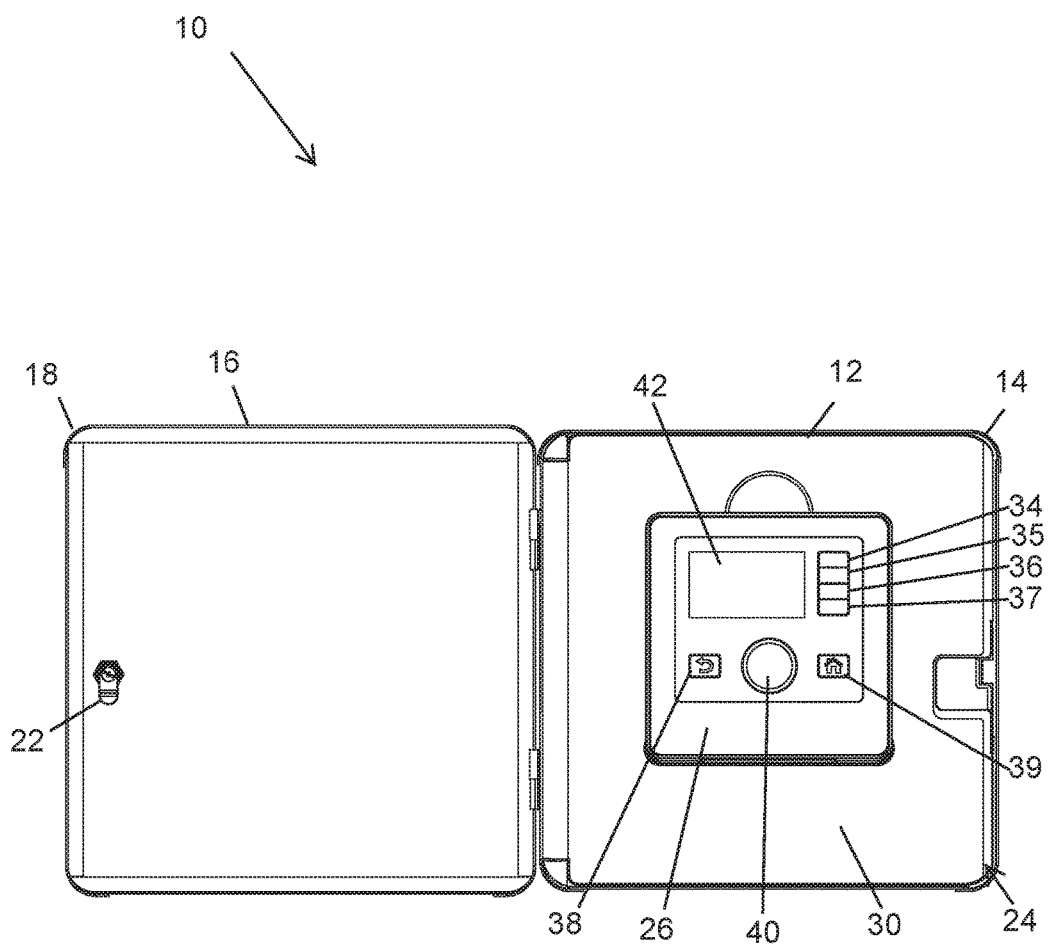
FIG. 2 is a plan view of FIG. 1 with the front door open to show a face pack mounted to the front side of an inner door, according to certain embodiments.

FIG. 1 illustrates an exemplary irrigation controller 10 with a front door in a closed position. FIG. 2 illustrates the irrigation controller 10 with the front door open to show a face pack mounted to the front side of an inner door and FIG. 3 illustrates the irrigation controller 10 with the front and inner doors open to show a wiring hook up area.

Figure 3:
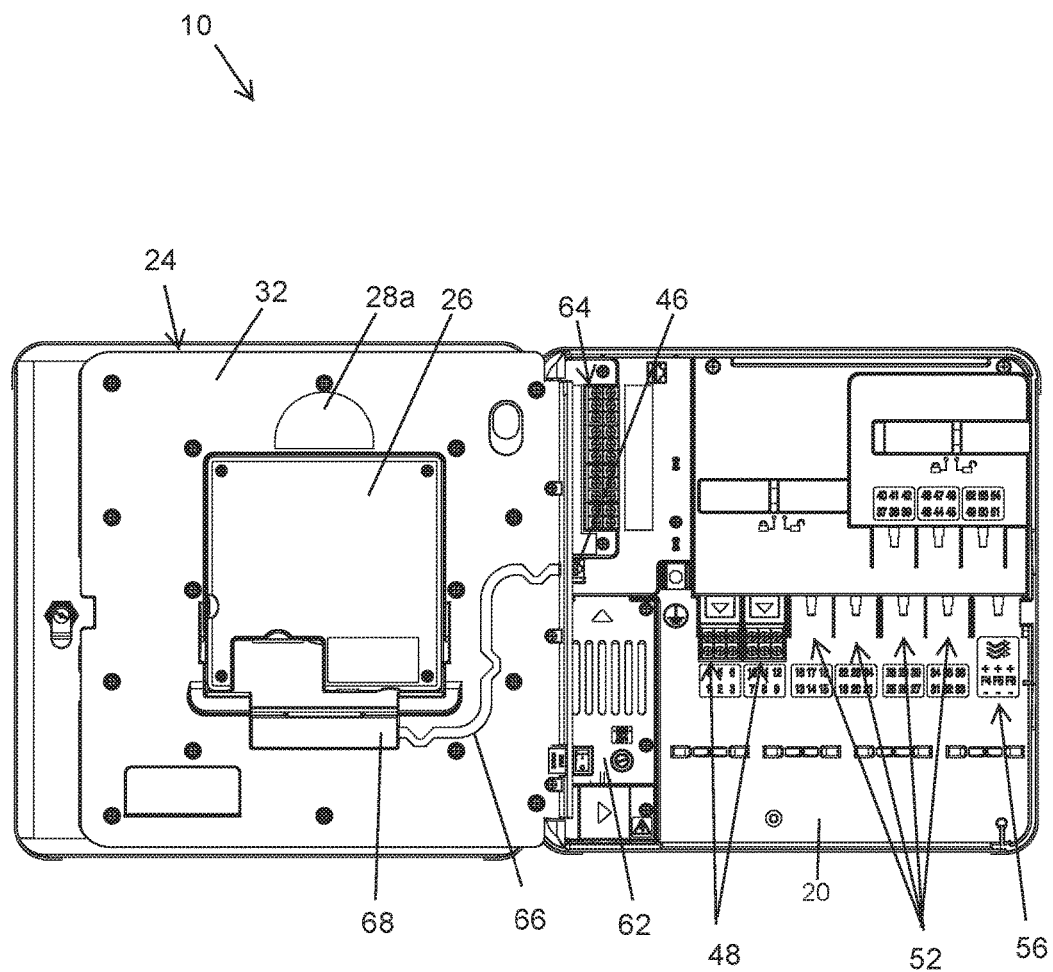
FIG. 3 is a plan view of FIG. 1 with the front and inner doors open to show a wiring hook up area, according to certain embodiments.

Referring to FIGS. 2 and 3, the irrigation controller 10, in an embodiment, comprises an outer housing 12 with radiused edges 14 including a generally box-shaped front door 16 hinged along its left vertical edge to the outer housing 12. The front door 16 may comprise radiused edges 18 that fit over the radiused edges 14 when the front door 16 is closed. A generally box-shaped back panel 20 (FIG. 3) is mounted to the interior area of the outer housing 12. The back panel 20 may include sides and other features that project inwardly into the outer housing 12. A lock 22 may be installed in the front door 16 that interacts with the back panel 20 or the outer housing 12 to keep the front door 16 securely closed unless unlocked and opened with an appropriate tool.

Figure 7:
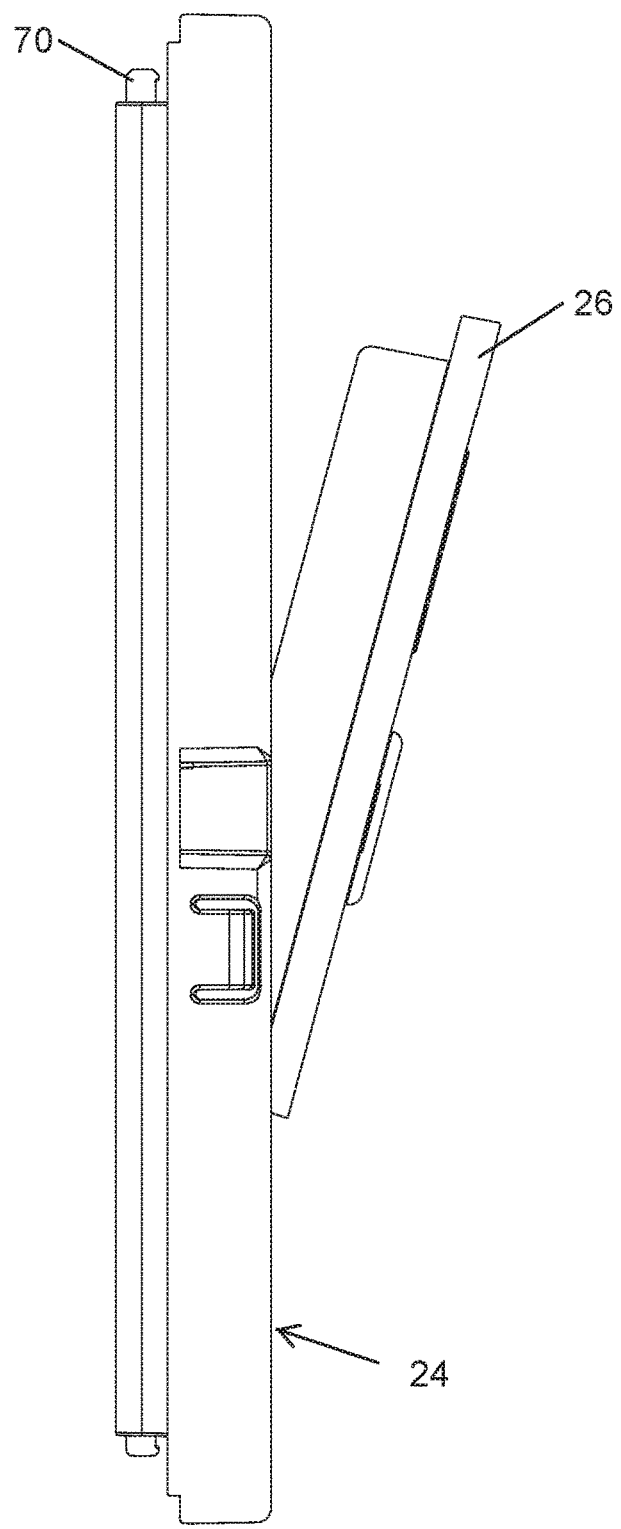
FIG. 7 is a side view of the inner door illustrating the face pack tilted outward from the back side of the inner door, according to certain embodiments.
Figure 8:
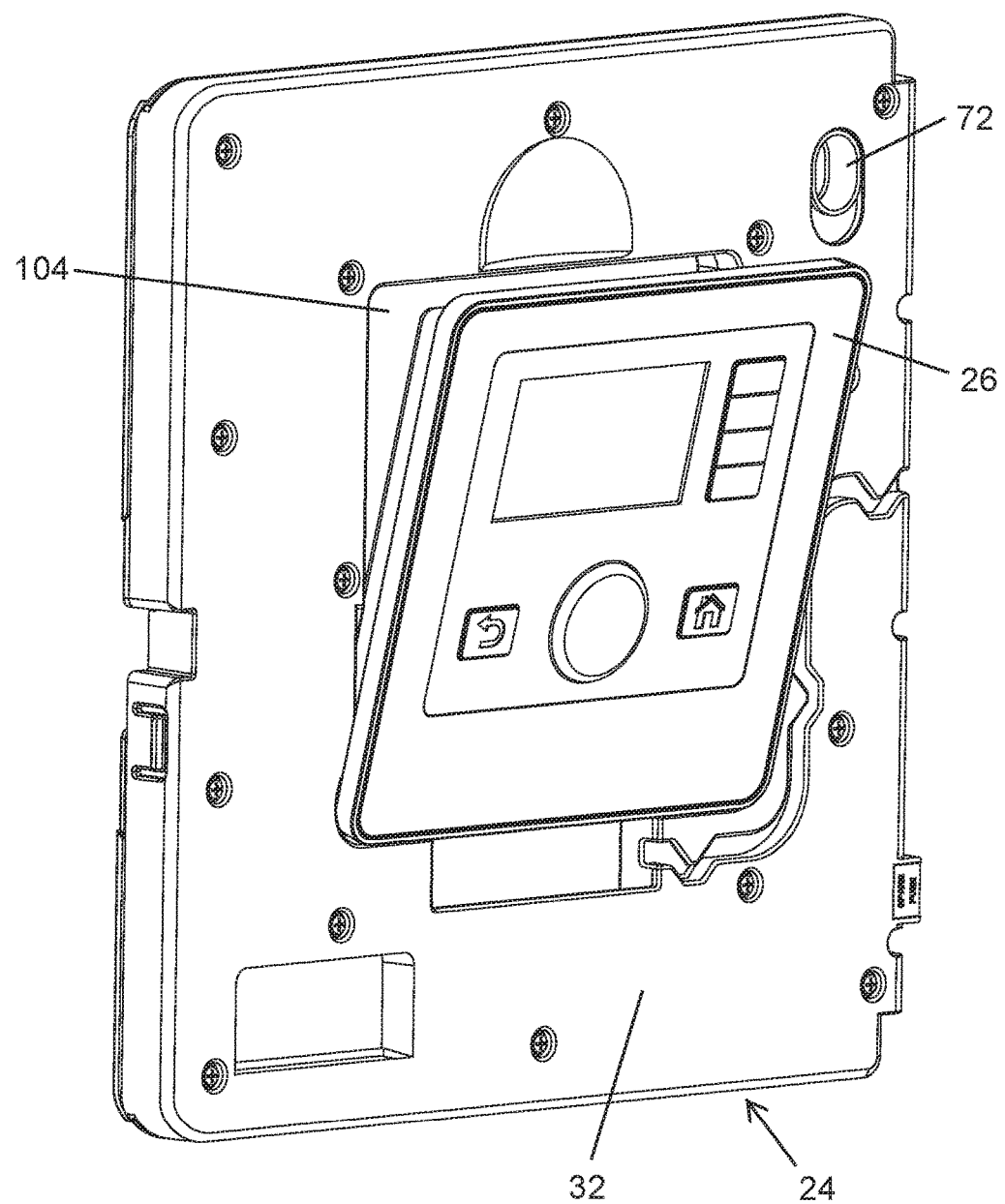
FIG. 8 is an isometric view of the inner door illustrating the face pack tilted outward from the back side of the inner door, according to certain embodiments.
Figure 9:
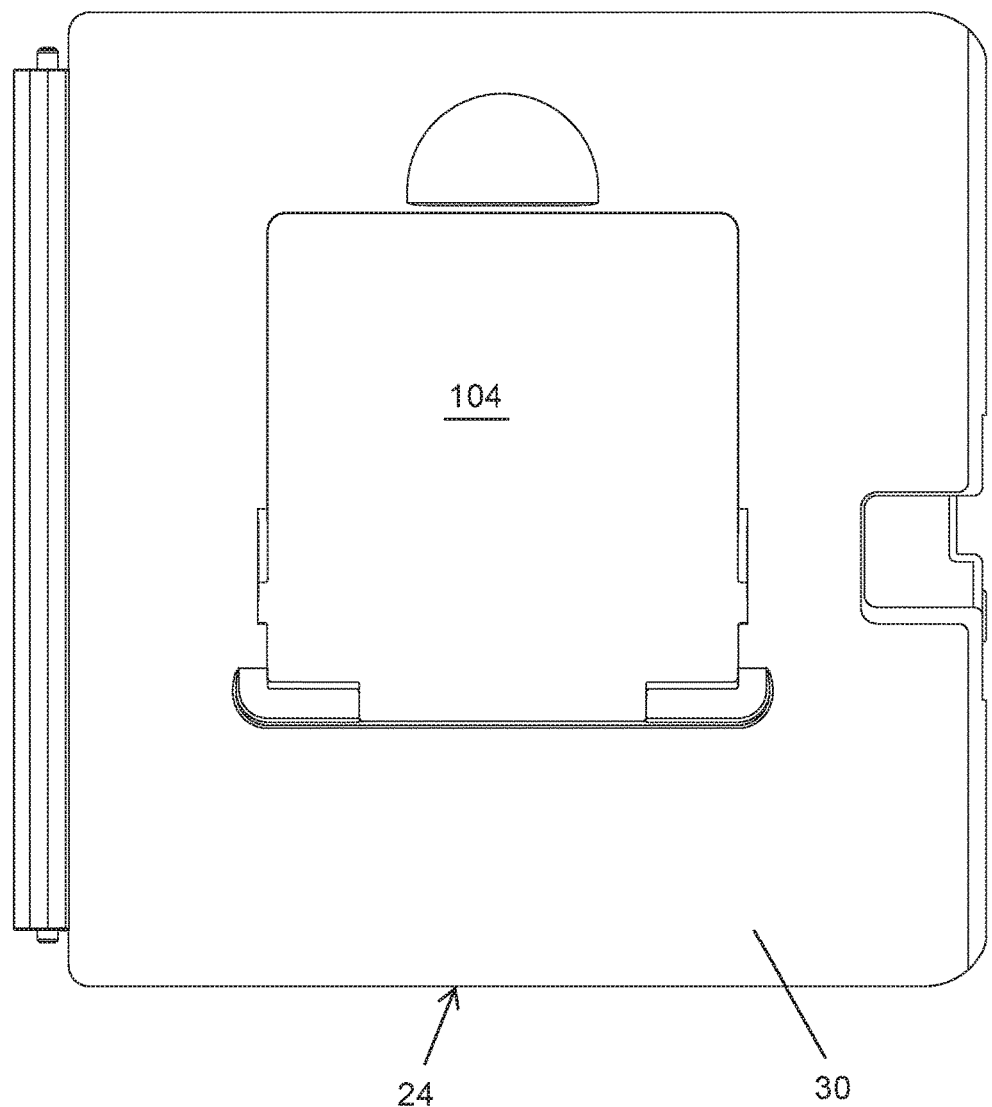
FIG. 9 shows the front side of the inner door, according to certain embodiments.
Figure 10:
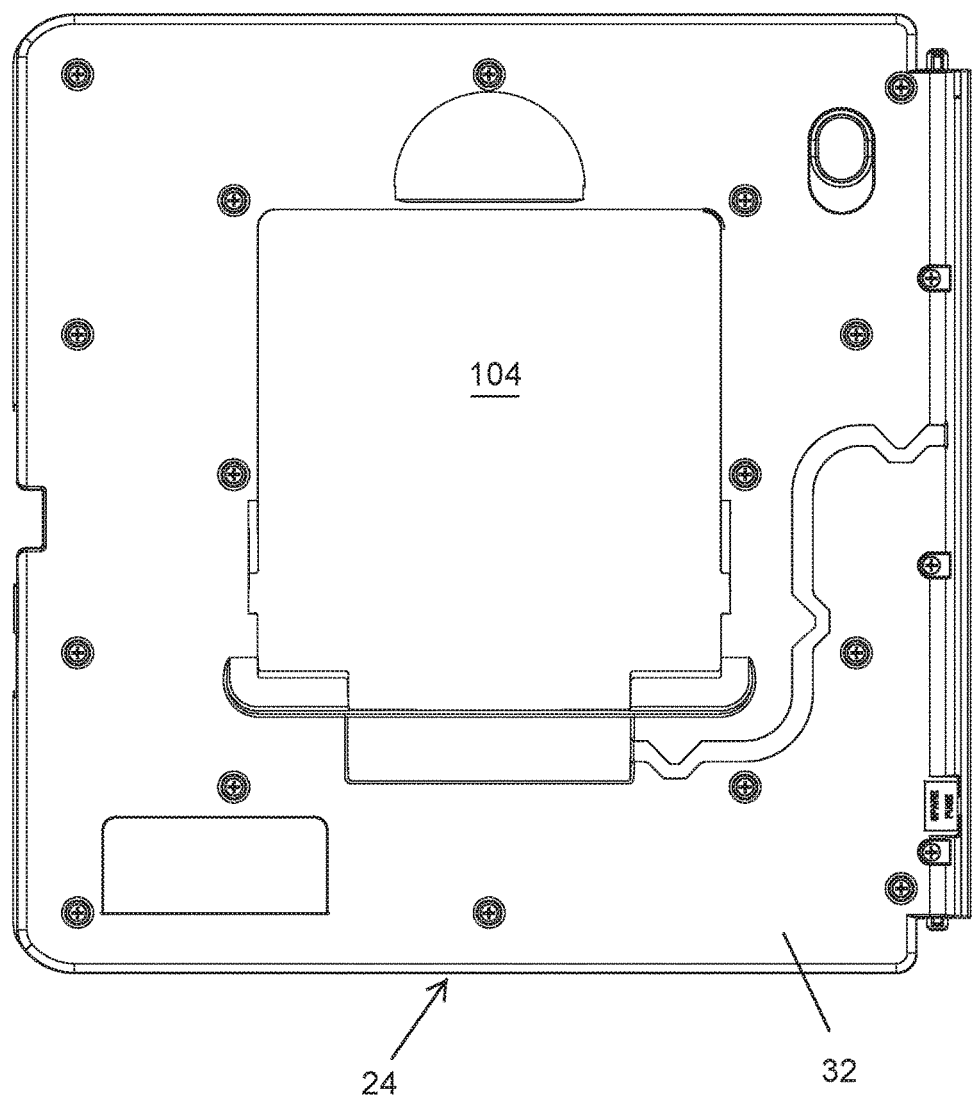
FIG. 10 shows the back side of the inner door, according to certain embodiments.

An inner door 24 is removably mounted to the back panel 20 or the outer housing 12. The inner door 24 includes a front panel 30 and a back panel 32. FIG. 9 illustrates the front panel 30 of the inner door 24 and FIG. 10 illustrates the back panel 32 of the inner door 24. Referring to FIGS. 7 and 8, the inner door 24 can be removed from the irrigation controller 10, in an embodiment, by retracting the hinge pin 70 (FIG. 7) to allow the inner door 24 to tilt out and be removed from the irrigation controller 10. A user may insert a finger into the hinge pin operator 72 (FIG. 8) and move it downward to retract the hinge pin 70 out of a mouthing hole (not illustrated) in the back panel 20.

A generally rectangular face pack 26 (FIG. 2) is removably mounted to the inner door 24 and is normally concealed by the front door 16 when not being accessed for programming. In an embodiment, the face pack 26 comprises a removable face pack 26. The face pack 26 comprises a plurality of manually actuable controls including push button switches 34, 35, 36, 37, 38 and 39 as well as a rotary push button switch 40, which can be manipulated in conjunction with numbers, words or graphic symbols indicated on a display 42 for entering or selecting a watering program as is well known to one of skill in the art of electronic irrigation controllers. Custom watering programs can be created by the user by manipulating the rotary push button switch 40 and selected ones of the push button switches 34, 35, 36, 37, 38 and 39. In an embodiment, the display 42 comprises a liquid crystal display. Other embodiments comprise other types of displays 42, such as LED display, video displays, or the like.

Figure 6:
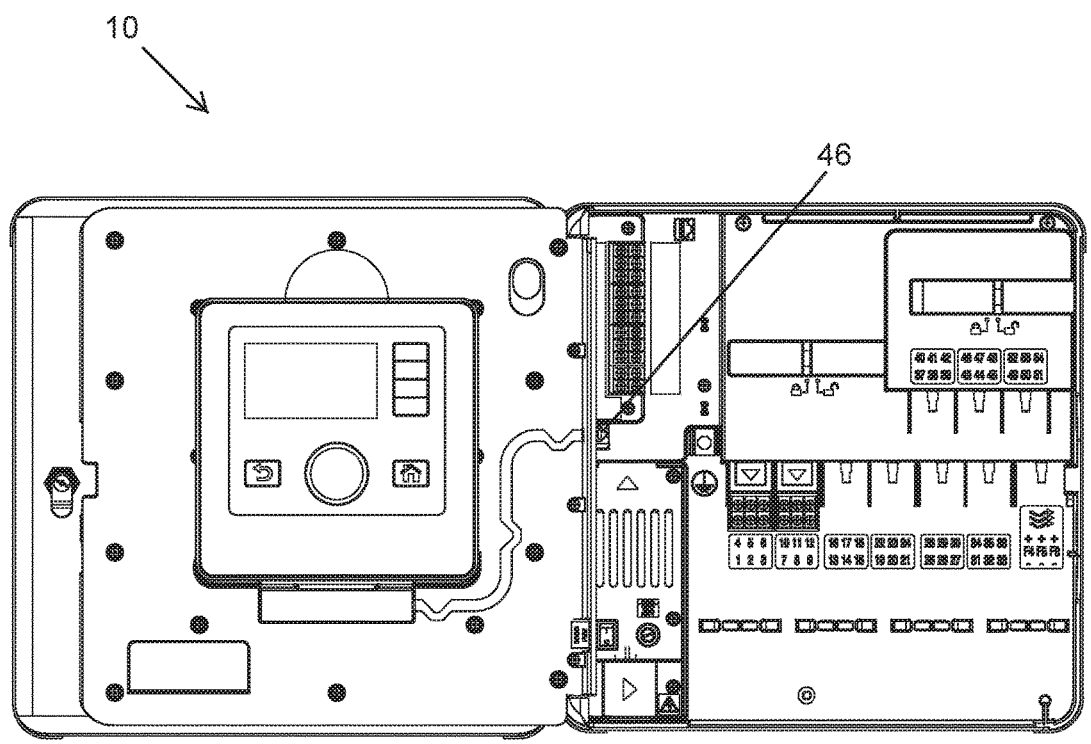
FIG. 6 is a plan view of FIG. 1 illustrating the face pack mounted to the back side of the inner door, according to certain embodiments.

In an embodiment, the face pack 26 supports a main circuit board assembly 44 (FIG. 14) with a processor, microprocessor, or microcontroller 3202 (FIG. 32) for executing and implementing a stored watering program. An electrical connection is made between the face pack 26 and the components in the back panel 20 through an electrical cable (not illustrated) connecting the circuit board assembly 44 and the face pack connector 46 (FIG. 6). The circuitry inside the face pack 26 can be powered through the electrical cable or by a battery installed in the face pack 26 to allow a person or user to remove the face pack 26, unplug the electrical cable, and walk around the lawn, or garden area while entering a watering program or altering a pre-existing watering program. The stored watering program, for example, can be a complex set of run time and cycle programs, or a portion thereof, such as a simple five minute cycle routine for a single station.

Figure 33A:
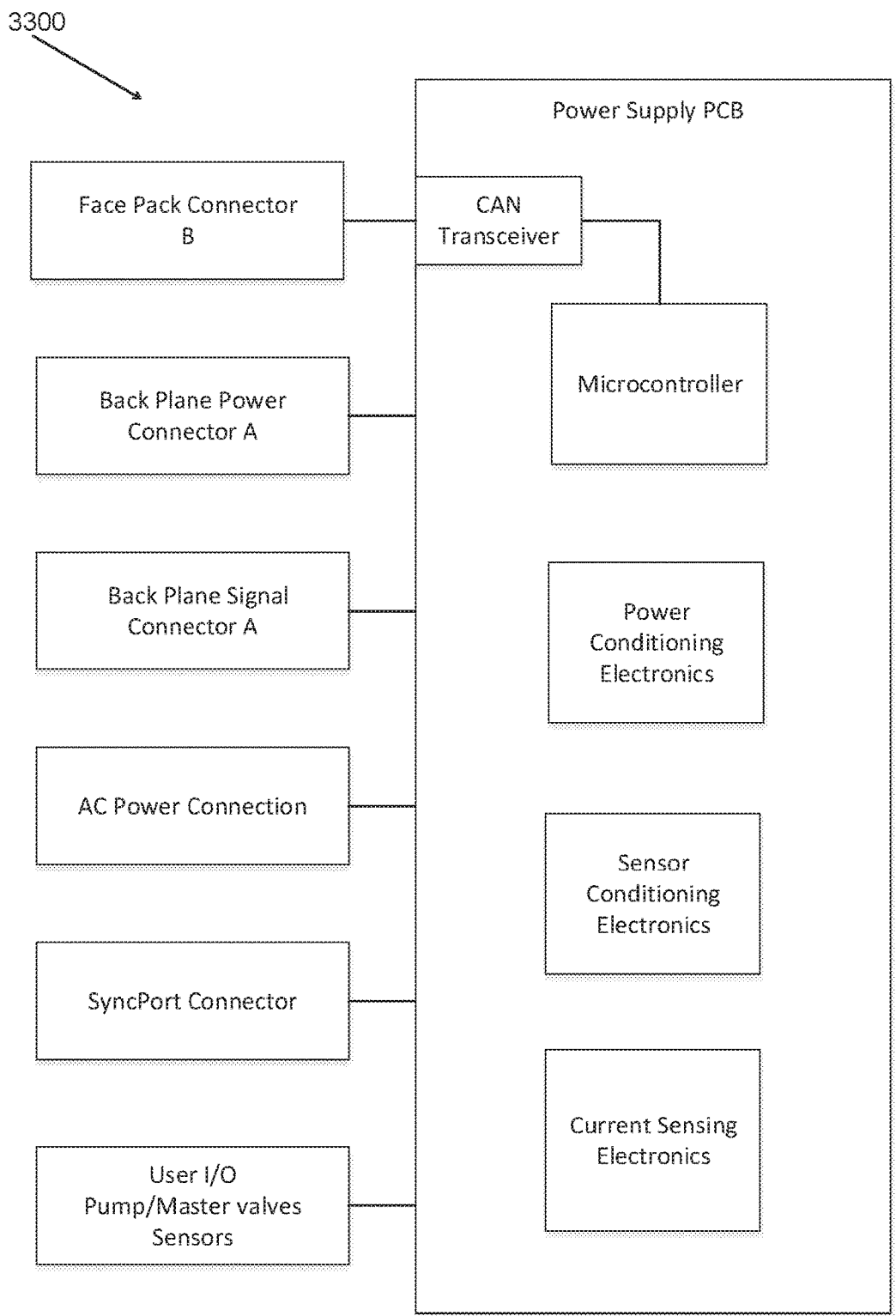
FIG. 33A is a block diagram illustrating exemplary power supply board circuitry for an irrigation controller, according to certain embodiments.
Figure 33B:
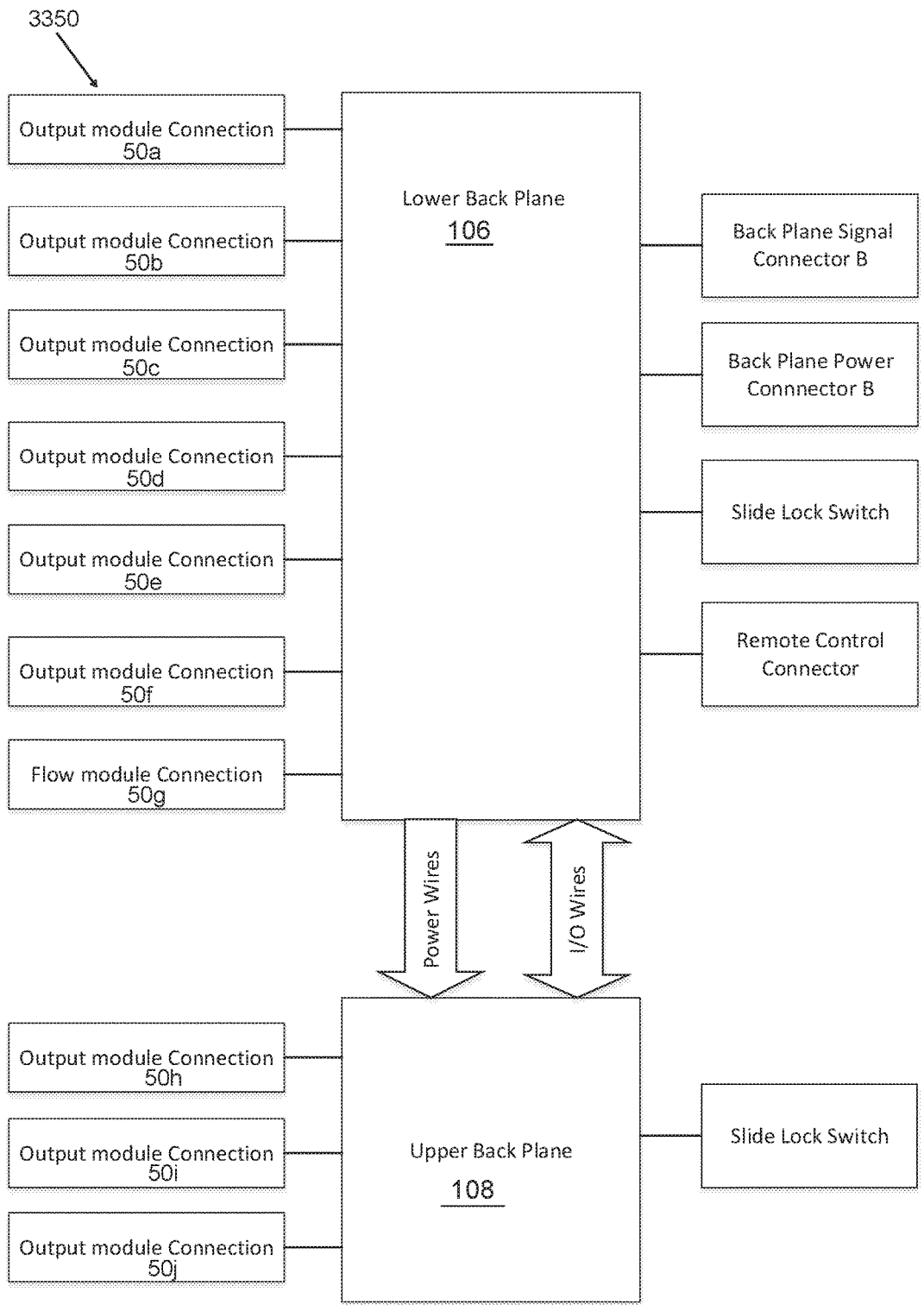
FIG. 33B is a block diagram illustrating exemplary back plane circuitry for an irrigation controller, according to certain embodiments.

Referring to FIG. 3, electrical connectors (not illustrated) in the ends of box-like station modules 48, receive corresponding output module connectors 50a-50j (FIG. 33B). The electrical connectors, in one embodiment, may be female male card edge connectors that mount to corresponding traces on the back plane printed circuit boards 106 and 108 (FIG. 33B). The intelligent station modules 48 are received in side-by-side fashion in a bay 52 formed in the back panel 20 (FIG. 3) which is separate from the face pack 26 that encloses the processor 3202. A fourth box-like flow expansion module 54 (FIG. 5) plugs onto its own bay 56 and interfaces with at least one flow sensor in the irrigation plumbing (not illustrated).

Locking slide bars 58 and 58a (FIG. 4) with a gripping member 60 and 60a, respectively, extend above the bays 52, 56 and may be moved back and forth between an unlocked position and a locked position. Projections (not illustrated) on the underside of the slide bars 58 and 58a engage and disengage with complementary features (not illustrated) on the top surfaces of the modules to achieve the locked and unlocked states. The gripping members 60 and 60a are alternately positioned adjacent to UNLOCKED and LOCKED indicia molded into the adjacent back panel structure to indicate the module connection status to the user. The positive module locking mechanism guards against partial or incomplete insertion of a module that could lead to open connections or shorts that would make a station or zone inoperable. The user is given visual and tactile feedback indicating that a positive lock has been established in the sense that each module has been fully inserted. The plurality of station modules 48 and flow expansion module 54 are simultaneously locked and unlocked with respect to their respective receptacles, which, in the embodiment illustrated in FIG. 3, are bays 52, 56 formed by side by side sections or regions of the bay formed in the back panel 20.

As used herein, the term "receptacle" refers to any structure and/or slot, region, area or section of any part of an irrigation controller frame or housing intended to receive and mechanically support, either internally or externally, a module and allow electrical contact and/or wireless connection between circuitry within the module and circuitry in the remainder of the controller. In the irrigation controller 10, each of the receptacles is defined by short sidewalls that divide a rear support wall of the rectangular bays 52 and 56 in the back panel 20 and includes the associated output module connectors.

In an embodiment, the back panel 20 comprises an outwardly opening plastic box that provides a support and a protective enclosure for removably receiving the modules 48 and 54. The back panel 20 may also support a power supply 62 and an additional terminal strip 64. The terminal strip 64 may be used as a connection point for various types of sensors, pump start relays, and common wires required for the irrigation site.

Referring to FIG. 3, the electric cable that electrically connects the face pack 26 to the back panel 20 may be plugged into a receptacle (not shown) in the bottom of the face pack 26 and the receptacle 46 in the back panel 20. The electrical cable may be routed in a cable carrier 66 and a cable storage cavity 68. The face pack 26 may be removed and repositioned so it advantageous for the electrical cable to have extra cable length to allow the face pack 26 to be removed and repositioned without disconnecting it from the electrical cable. In one embodiment, a cable storage cavity 68 provides a place to store the extra cable length.

The face pack 26 may be used to program and view program related data and other system information as well as provide diagnostic tools to the user. As seen in FIG. 3, when the inner door 24 is open to expose the wiring hook up area, the front side of the face pack 26 with the operator controls 34-40 and the display 42 are hidden from view and only the back side of the face pack 26 is visible to the user. In some instances, the user may want to see the front side of the face pack 26 to be able to utilize display 42 and control functions that may be beneficial in identifying problems with the irrigation system when the inner door 24 is open as illustrated in FIG. 3. In one embodiment, the face pack 26 may be removed from its mounting position on the front side of the inner door 24 and repositioned to the back side of the inner door 24.

Figure 4:
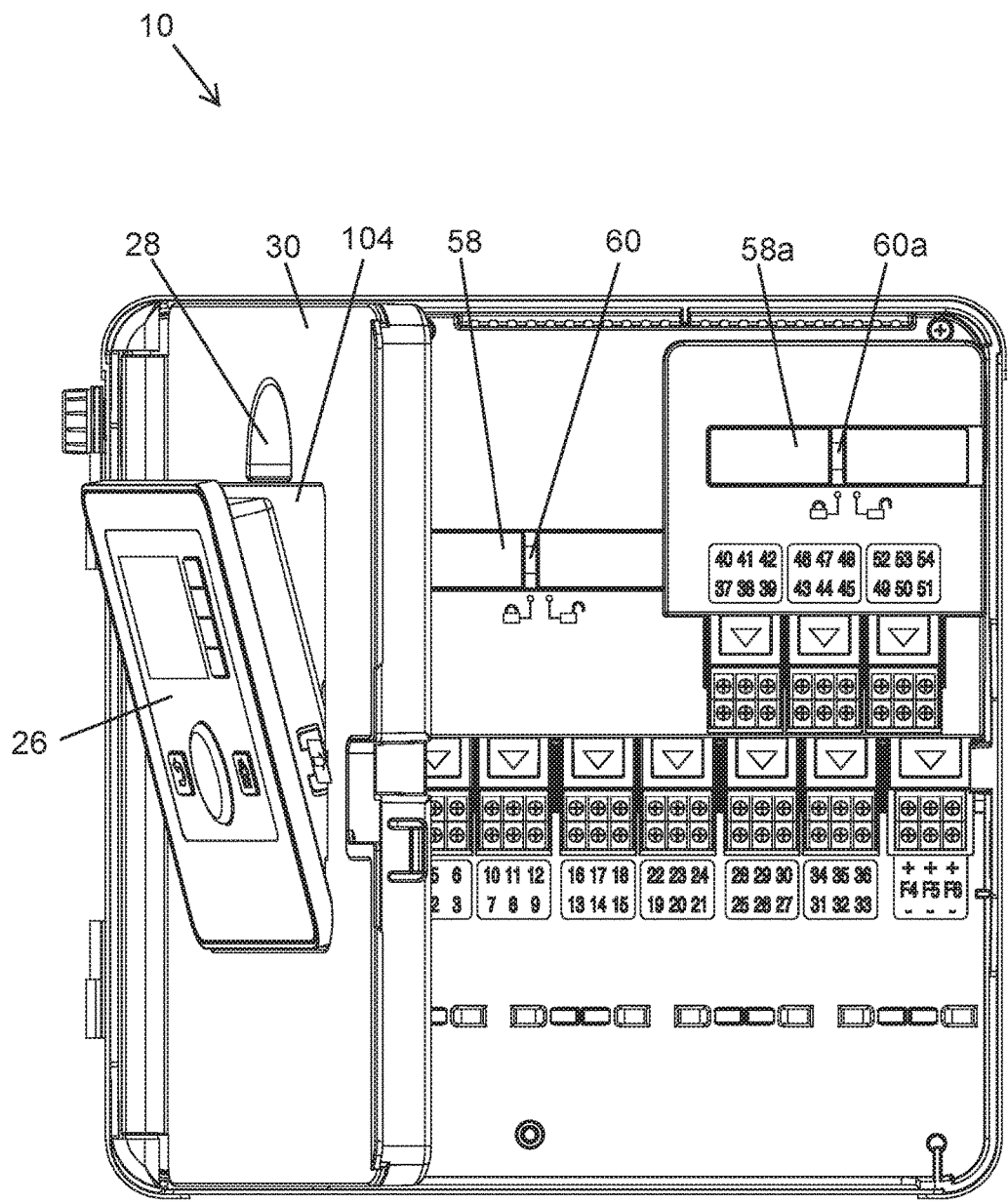
FIG. 4 is a plan view of FIG. 1 with the inner door partially open and showing the face pack tilted outward from the front side of the inner door, according to certain embodiments.
Figure 5:
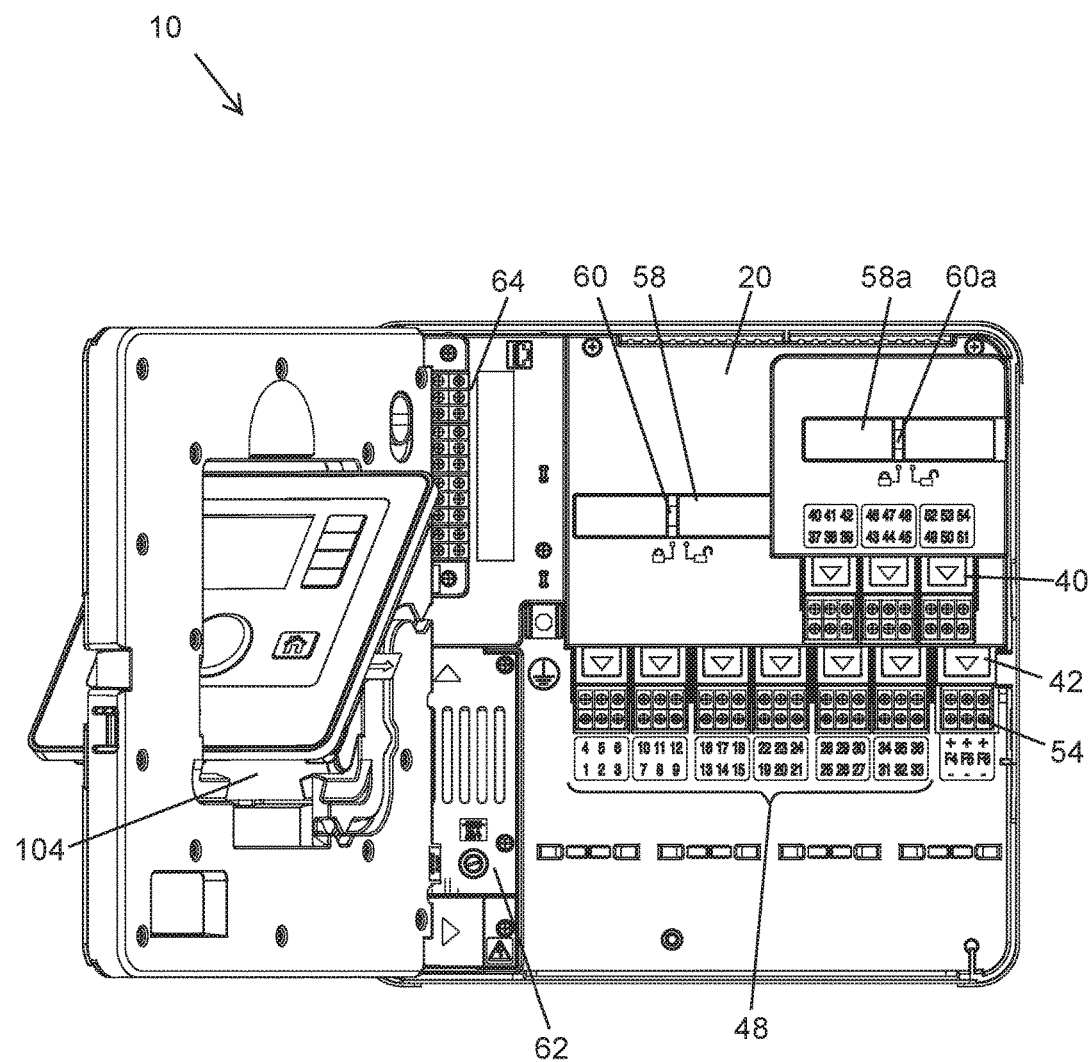
FIG. 5 is a plan view of FIG. 1 with the inner door partially open and showing the face pack passing through the inner door, according to certain embodiments.

FIG. 4 illustrates the irrigation controller 10 with the inner door 24 partially open and showing the face pack 26 tilted outward from the front side of the inner door 24; FIG. 5 illustrates the irrigation controller 10 with the inner door 24 partially open and showing the face pack 26 passing through the inner door 24; and FIG. 6 illustrates the face pack 26 mounted to the back side of the inner door 24.

As illustrated in FIGS. 4-6, users may insert their fingers into a recess 28 (FIG. 4) and pull the top of the face pack 26 away from the front panel 30 of the inner door 24. In some embodiments, the face pack 26 can be removed from the front side of the inner door 24 and moved to the inside or back side of the inner door 24 as illustrated in FIGS. 5 and 6.

FIGS. 7 and 8 are a side view and an isometric view, respectively, of the inner door 24 and illustrate the face pack 26 in a tilted position on the back panel 32 of the inner door 24. A user may pull the top of the face pack 26 away from the inner door 24 to place the face pack 26 in the position shown. If desired, the user could then lift the face pack 26 up and away from the inner door 24. A user could also place the face pack 26 into the inner door 24 to the position shown in FIGS. 7 and 8, then push on the upper area of the face pack 26 until it is against the inner door 24 for normal operation.

FIGS. 11-21 illustrate the mechanical features of one embodiment to facilitate the face pack 26 to be easily removable from one side and reinstalled on the other side of the inner door 24.

Figure 11:
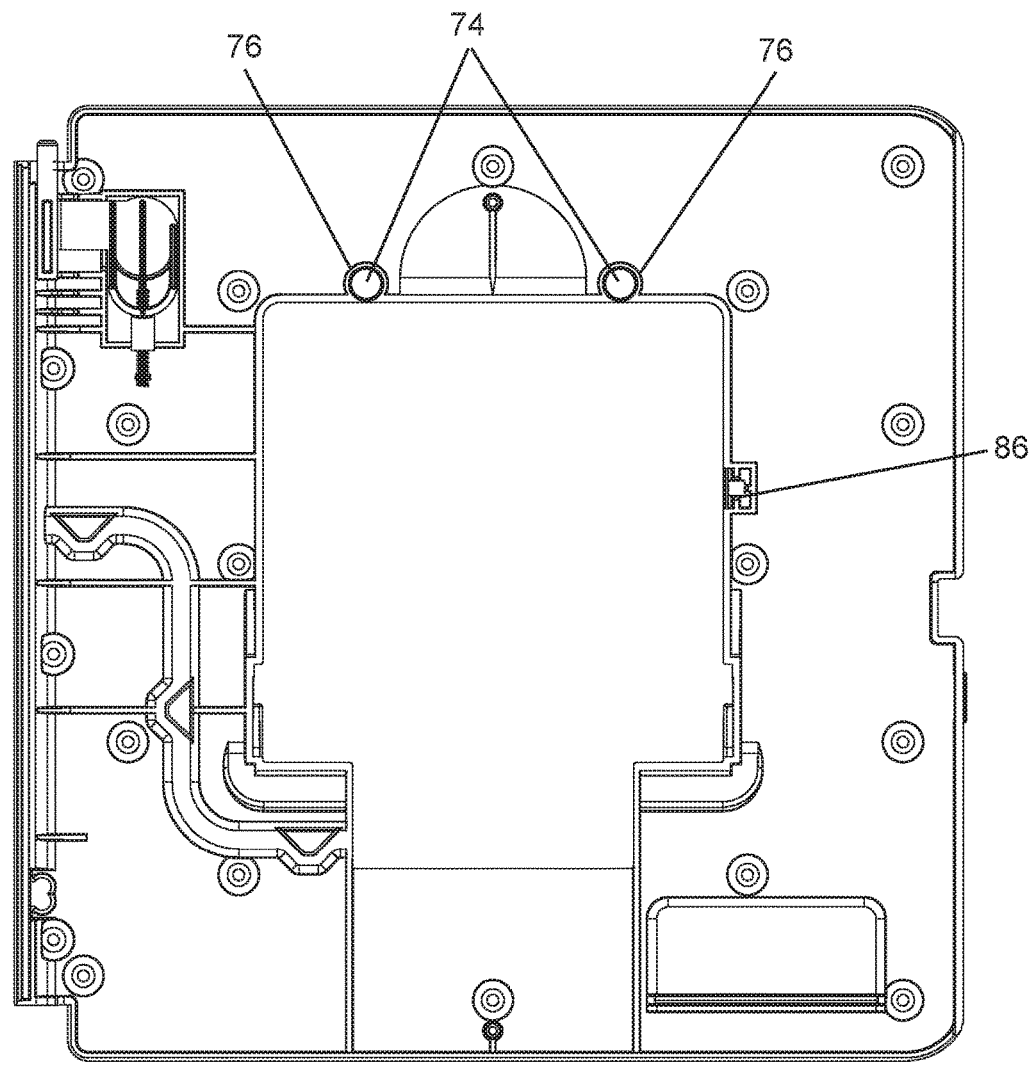
FIG. 11 shows the back side of the inner door of FIG. 10 with the back cover removed, according to certain embodiments.

In an embodiment, the face pack 26 may be held upright against the inner door 24 in an operating position by one or more magnets. As illustrated in FIG. 11, at least one magnet 74 may be positioned inside the inner door 24. In one embodiment, two magnets 74 are positioned inside the inner door 24. In other embodiments, more than two magnets 74 are positioned inside the inner door 24. FIG. 11 illustrates the inside of the front panel 30 of the inner door 24 with the back panel 32 of the inner door 24 removed. Each of the face pack holding magnets 74 are positioned in cavities 76 formed in the inner surface of the front panel 30 of the inner door 24.

Figure 12:
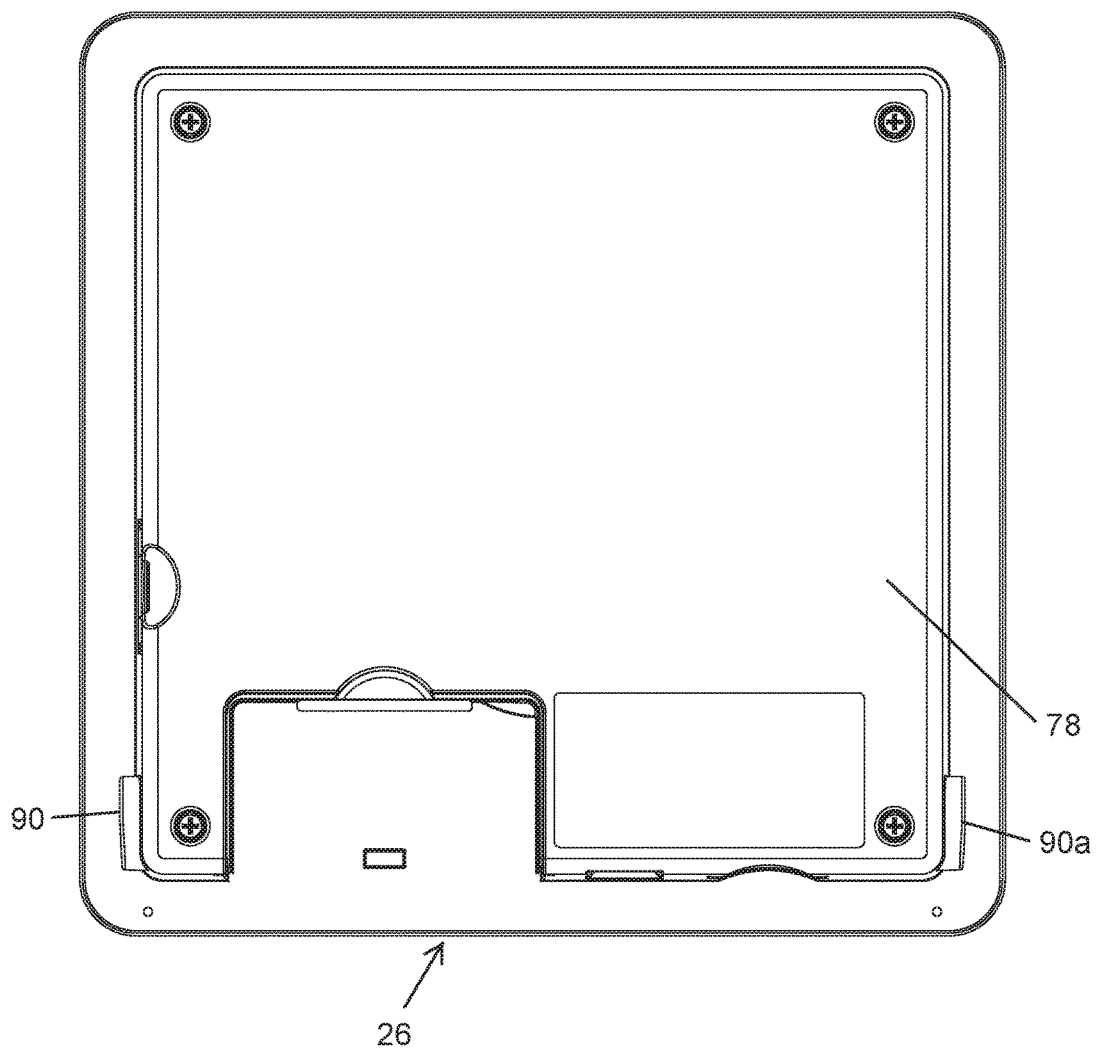
FIG. 12 shows the back side of the face pack, according to certain embodiments.
Figure 13:
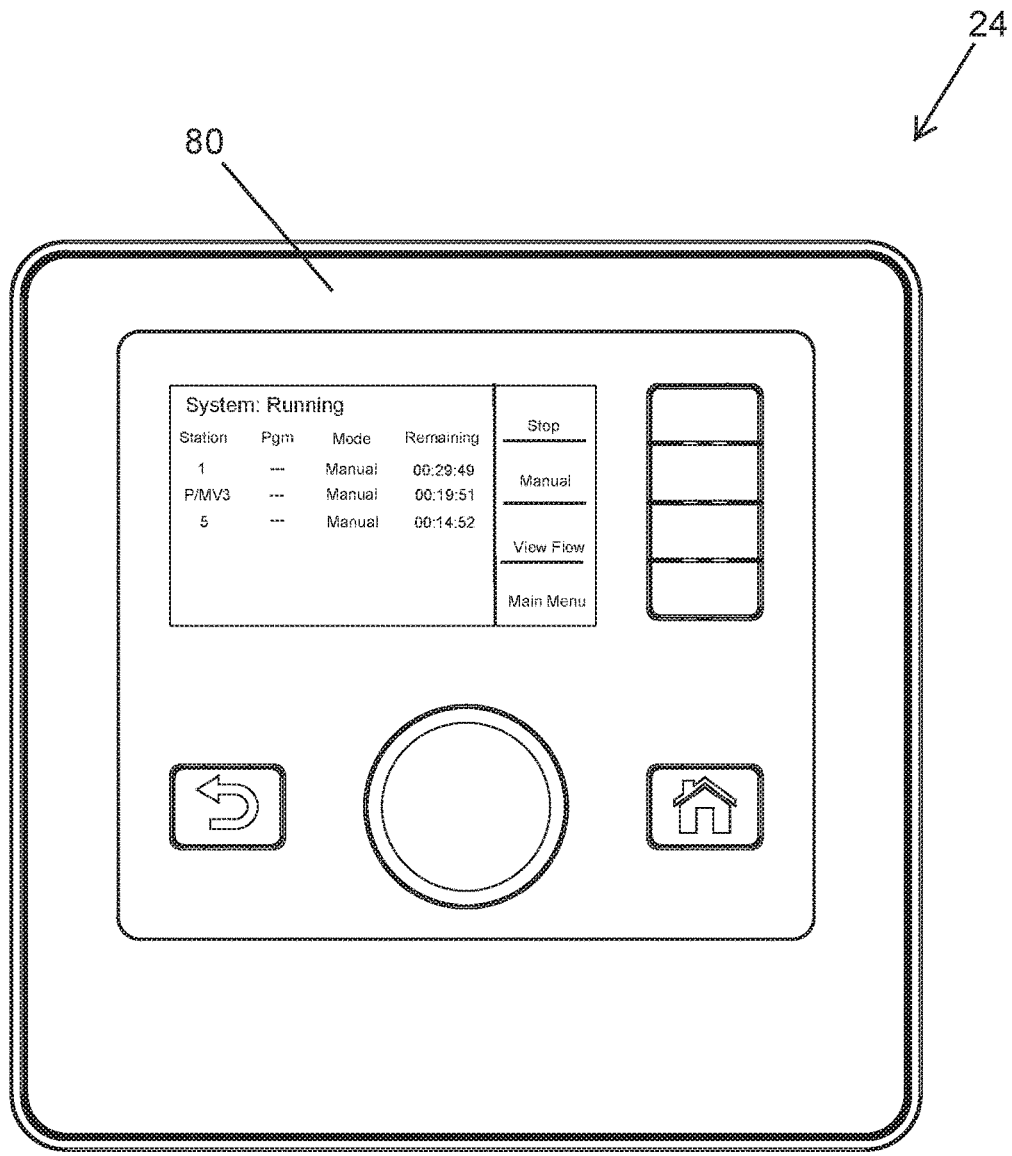
FIG. 13 shows the front side of the face pack, according to certain embodiments.

FIG. 12 illustrates the back side of the face pack 26 and FIG. 13 illustrates the front side of the face pack 26. The face pack 26 comprises a rear panel 78 (FIG. 12) and a front panel 80 (FIG. 13). The rear panel 78 comprises an inner surface 82.

Figure 14:
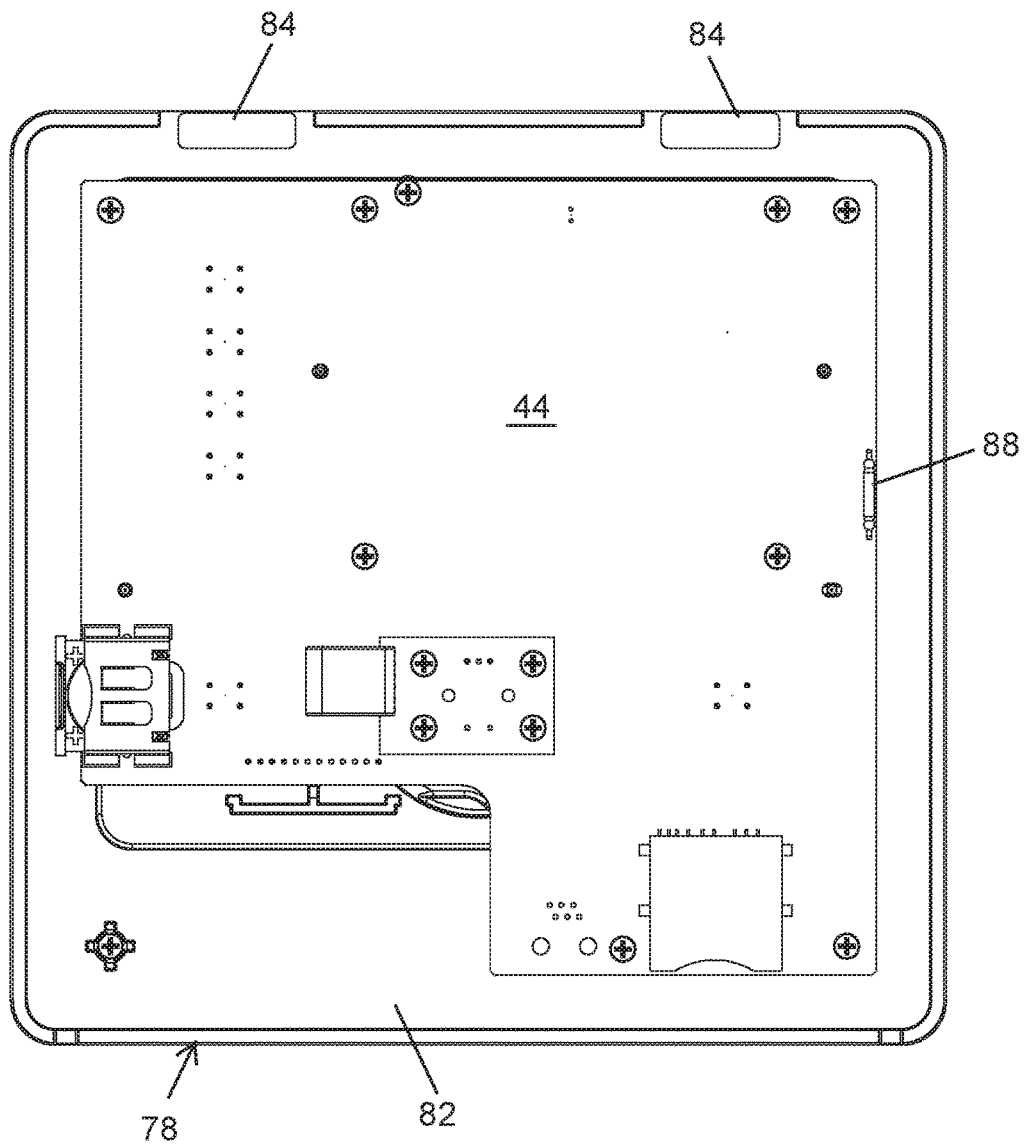
FIG. 14 shows the front side of the face pack of FIG. 13 with the front cover removed exposing a circuit board, according to certain embodiments.

FIG. 14 illustrates an embodiment of the face pack 26 with the front panel 80 removed to expose the circuit board assembly 44 mounted to the inner surface 82 of the rear panel 78. The circuit board assembly 44 may include all of the circuitry in the face pack 26. One or more metallic plates 84 may be installed to the inner surface 82. In an embodiment, the one or more metallic plates 84 are attracted to the one or more holding magnets 74 when the face pack 26 is installed in the inner door 24 to hold the face pack 26 against the inner door 24. The one or more metallic plates 84 may be attracted to the one or more holding magnets 74 when the face pack 26 is installed against either the front panel 30 or the back panel 32 of the inner door 24. In some embodiments, the holding magnets 74 may be loosely fit into the one or more magnet holding cavities 76 to allow the magnets to move towards the magnetic plates 84 when the face pack 26 is installed.

In an embodiment, a switch activation magnet 86 attaches to the inner door 24. In one embodiment, the switch activation magnet 86 may be installed to the inner surface of the front panel 30 of the inner door 24 (FIG. 11). A magnetically actuating switch, such as a reed switch, part number MDSM-4R-12-18 from Littlefuse Inc. or the like, or a magnetically actuating sensor, such as an IC Hall Effect Switch Part number A3212EUA-T from Allegro Micro systems or the like, may be installed on the circuit board assembly 44 of the face pack 26. Additionally, other switches that do not require a magnet could be used, such as an optical detector sensor part number SI1102-A-GMR from Silicone Labs, or the like, or a tactile switch part number 688-SKHHAJ from E-Switch, or the like. The magnetically actuating device 88 actuates when the switch activation magnet 86 is in close proximity.

In one embodiment, a reed switch 88 (FIG. 14) is installed on the circuit board assembly 44. The switch activation magnet 86 is in proximity with the reed switch 88, or other magnetically activated sensor when the face pack 26 is installed on one side of the inner door 24 such that the reed switch 88 is in an actuated state and the switch activation magnet 86 is far enough away from the reed switch 88 when the face pack 26 is installed on the other side of the inner door 24 such that the reed switch 88 is in an unactuated state. The face pack microprocessor 3202 reads the state of the reed switch 88 and, based on the state of the reed switch 88, the face pack microprocessor 3202 causes certain ones of a plurality of screens to be displayed on the display 42. In an embodiment, the plurality of screens comprise, for example, one of more of irrigation related screens, such as operation screens, Home Screen (Main Display), Run Manual Stations, Run Manual Program, Run Test Program, Program Start Times, Program Run Times. Program Water Days, Program Seasonal Adjust, Program Rules, Calendar Days Off, Program Summary, Station Setup, Station Cycle & Soak, Blocks, Station Limits, Station Summary, P/MV Operation, Flow Sensors, Solar Sync, Click Sensors, Sensor Response, Flow Operations, Water Sources, Flow Zones, Flow Totals, Learn Flow, Clear Flow Alarms, Hydraulic Summary, Time/Date, Regional Settings, User Management, Networking, View Logs, Module Info, watering scheduling screens, system status screens, module information screens, and the like, diagnostic screens, such as click sensor diagnostic screens, flow sensor diagnostic screens, solar sync diagnostic screens, station-valve diagnostic screens, and the like, and other useful screens such as Export Logs, Easy Retrieve, Reset Memory, Firmware Update, Conditional Response, and the like.

For example, it may be helpful to a user to be able to view operating information on the display 42 when the face pack 26 is installed on the front face of the inner door 24 and the inner door 24 is in the closed position. It may be also helpful to a user to be able to view diagnostic information on the display 42 when the face pack 26 is installed on the back face of the inner door 24 and the inner door 24 is in the open position.

In one embodiment, when the face pack 26 is installed on the front side of the inner door 24, the reed switch 88 is not in close proximity to the switch activation magnet 86 such that the reed switch 88 is in its unactuated state and the face pack microcontroller 3202, based on the unactuated state of the reed switch 88, causes an irrigation related screen to be displayed on the display 42. The irrigation related screen comprises operating information for the irrigation controller 10. When the face pack 26 is installed on the back side of the inner door 24, the reed switch 88 is in close proximity to the switch activation magnet 86 such that the reed switch 88 is in its actuated state and the face pack microcontroller 3202, based on the actuated state of the reed switch 88, causes a system diagnostic screen to be displayed on the display 42. The system diagnostic screen comprises diagnostic information for the irrigation controller 10.

In another embodiment, the irrigation controller 10 can be configured to place the reed switch 88 in its actuated state when the face pack 26 is installed on the front side of the inner door 24 and the face pack microcontroller 3202, based on the actuated state of the reed switch 88, causes an irrigation related screen to be displayed on the display 42. The irrigation controller 10 is further configured to place the reed switch 88 in its unactuated state when the face pack 26 is installed on the back side of the inner door 24 and the face pack microcontroller 3202, based on the unactuated state of the reed switch 88, causes a diagnostic screen to be displayed on the display 42.

As used herein, "in close proximity" refers to the switch activation magnet 86 being close enough to the reed switch 88 such that the reed switch 88 detects a sufficient magnetic field from the switch activation magnet 86 to place the reed switch 88 in an actuated state. As used herein "not in close proximity" refers to the switch activation magnet 86 being far enough away from the reed switch 88 such that the reed switch 88 does not detect a strong enough magnetic field from the switch activation magnet 86 to place the reed switch 88 in the actuated state.

Figure 15:
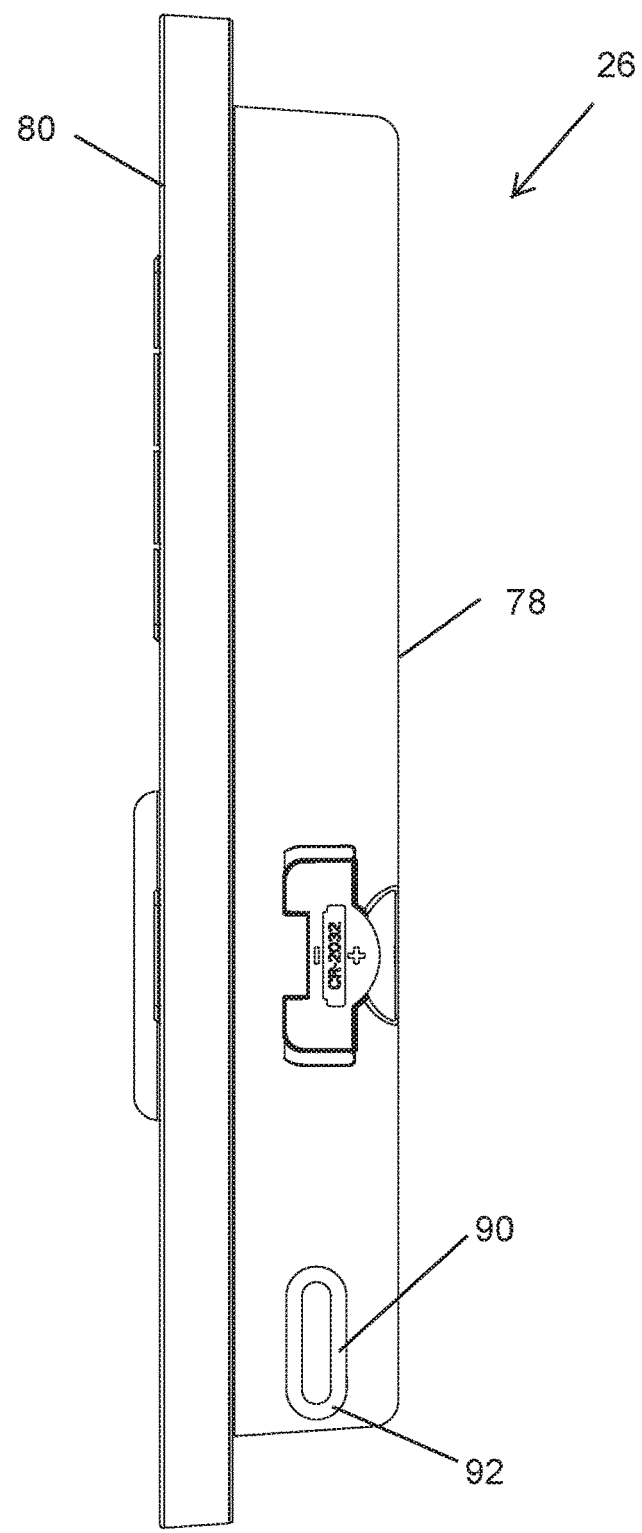
FIG. 15 shows the right side of the face pack, according to certain embodiments.

A locating feature is formed on at least one side of the face pack 26. FIG. 15 illustrates the right side of the face pack 26. Referring to FIG. 15, in one embodiment, generally rectangular locating bar 90 is formed on a first side of the back panel 78 of the face pack 26. As illustrated in FIG. 12, a second locating bar 90a may be formed on a second side of the back panel 78. In one embodiment, the locating bar may have at least one radius end 92. In some embodiments the ends of the locating bars 90, 90a may be the same shape. In other embodiments, the ends may be different shapes. The end may be radius, angular, or straight. In some embodiments, the locating feature may be circular, oval, triangular or any appropriate shape to locate the face pack 26 on the inner door 24.

Figure 16:
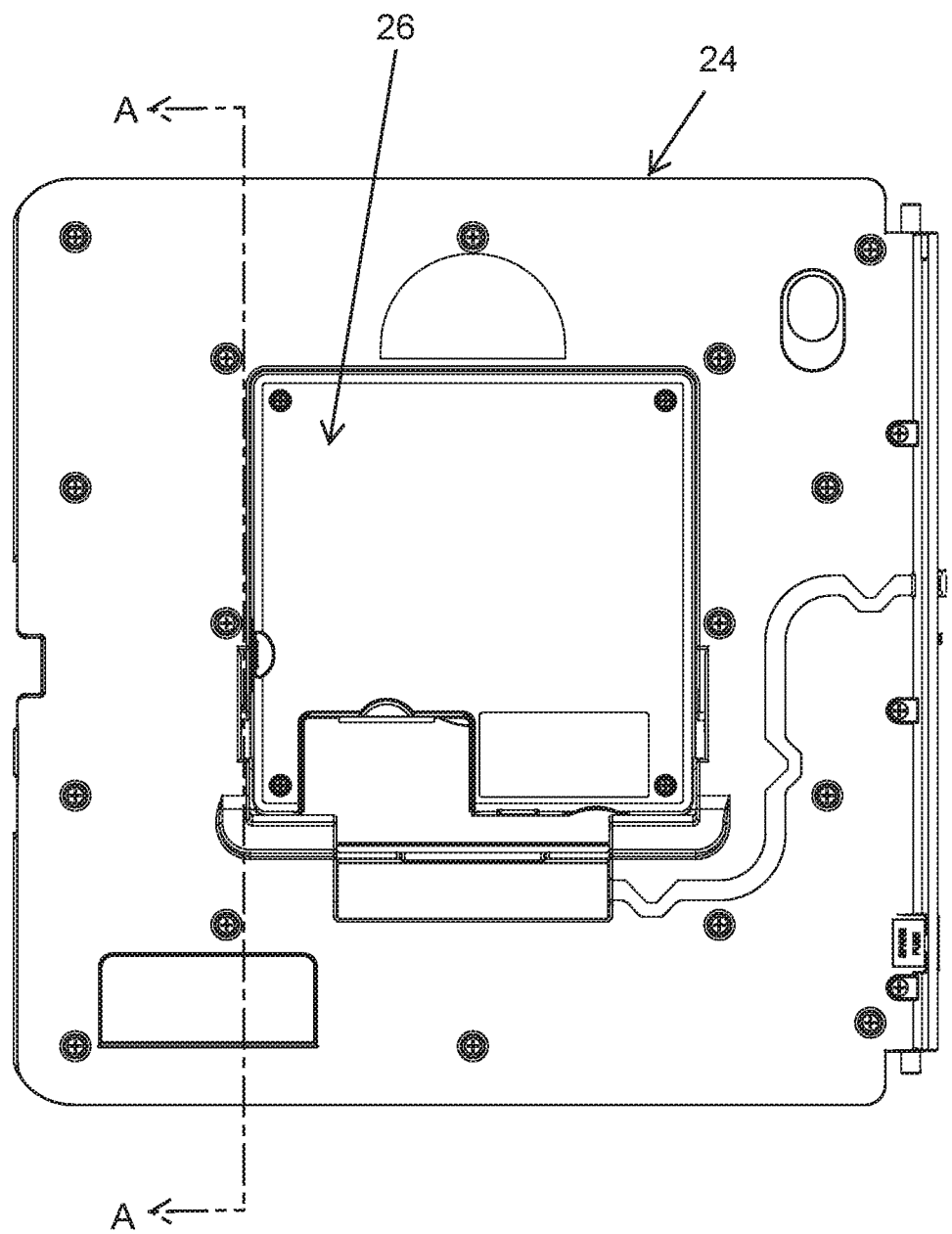
FIG. 16 shows the back side of the inner door and the face pack, according to certain embodiments.

FIG. 16 illustrates the back side of the inner door 24 and the face pack 26. Each of FIGS. 17-21 illustrates embodiments of the sectioned area AA on FIG. 16 that show the interaction between the face pack 26 and the inner door 24.

Figure 17:
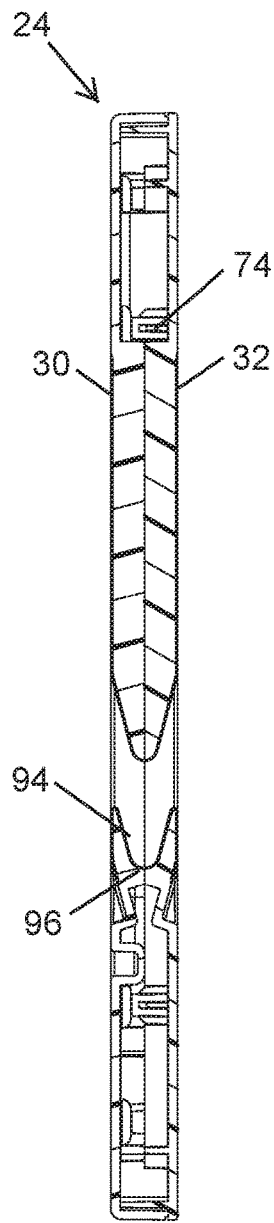
FIG. 17 is view of section AA in FIG. 16 with the face pack removed, according to certain embodiments.

FIG. 17 shows the sectioned area AA of FIG. 16 without the face pack 26 installed. A first generally V-shaped pocket, notch, or groove 94 is formed in the inner edge of the inner door 24. A radius 96 is formed in the bottom of the V-shaped groove 94. In one embodiment, the radius 96 is substantially the same or just slightly larger than the radius 92 on the locating bar 90 on the face pack 26. In one embodiment, the V-shaped groove 94 may be duplicated on at least one other inner edge surface of the inner door 24. In some embodiments, one V-shaped groove 94 may be used.

Figure 18:
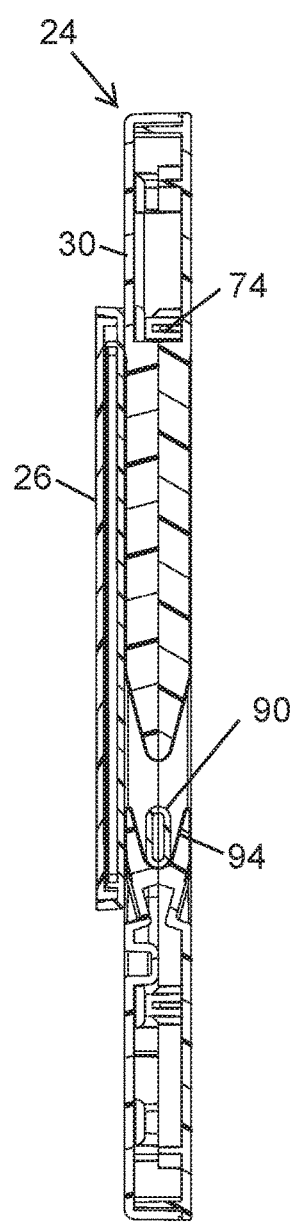
FIG. 18 is view of section AA in FIG. 16 with the face pack installed on the front side of the inner door, according to certain embodiments.

FIG. 18 illustrates the face pack 26 mounted to the front panel 30 of the inner door 24. The locating bar 90 is seated in the V-shaped groove 94 to hold the face pack 26 in its proper horizontal location. Furthermore, at least one holding magnet 74 is attracting the at least one metallic plate 84 to hold the face pack 26 tight against the front panel 30.

Figure 19:
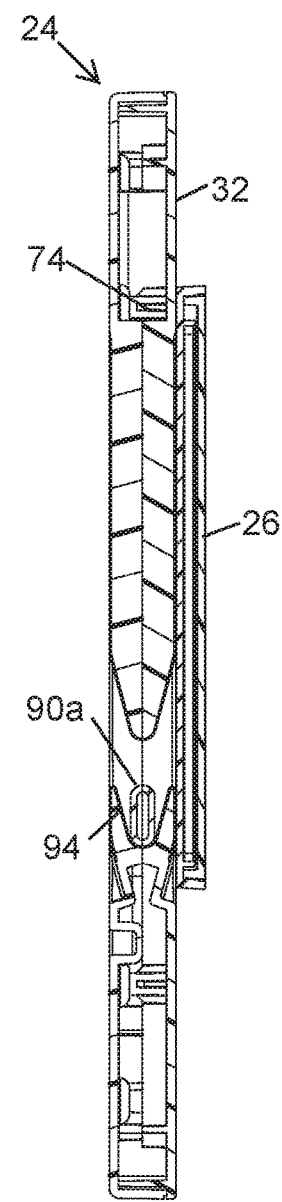
FIG. 19 is view of section AA in FIG. 16 with the face pack installed on the back side of the inner door, according to certain embodiments.

FIG. 19 illustrates the face pack 26 mounted to the back panel 32 of the inner door 24. The locating bar 90a is seated in the V-shaped groove 94 to hold the face pack 26 in its proper horizontal location. Furthermore, at least one holding magnet 74 is attracting the at least one metallic plate 84 to hold the face pack 26 tight against the back panel 32.

Figure 20:
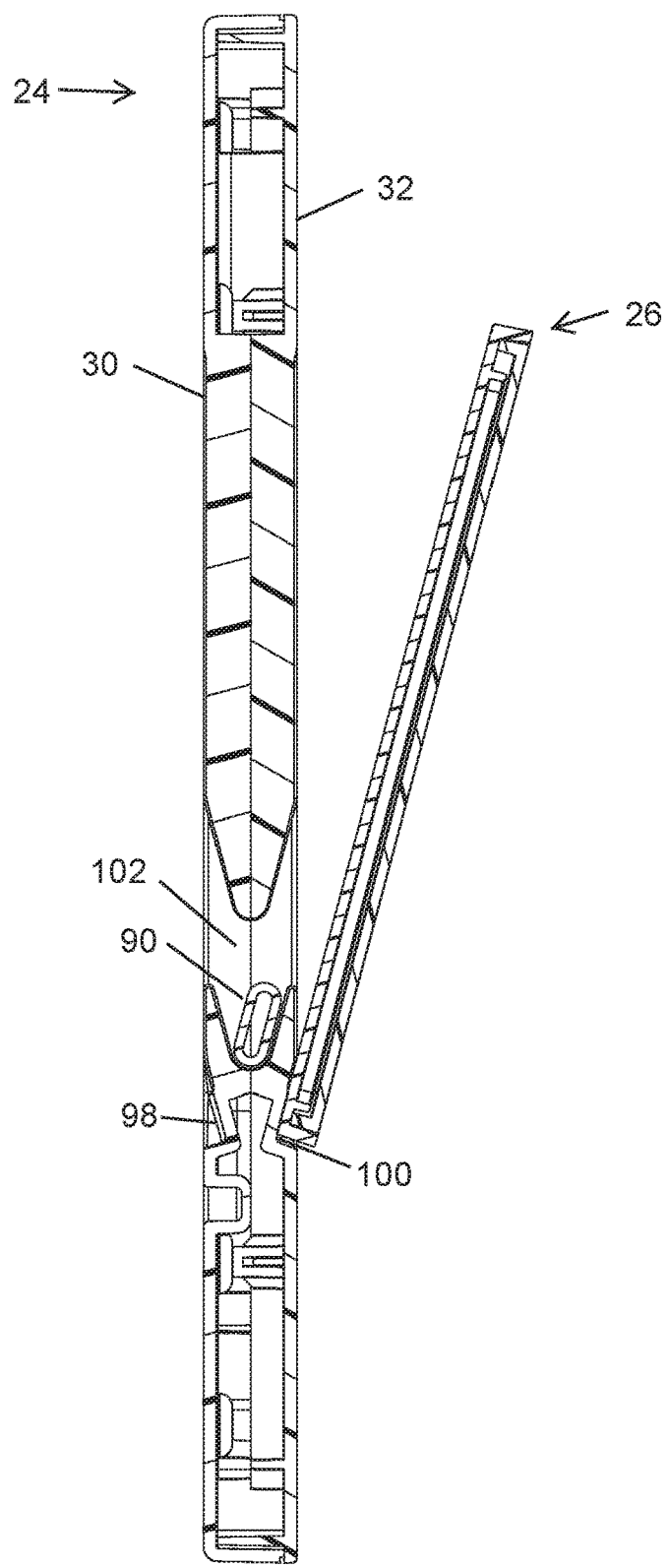
FIG. 20 is view of section AA in FIG. 16 with the face pack tilted outwardly from the back side of the inner door, according to certain embodiments.

As illustrated in FIG. 20, a recessed area 98 is formed in the front panel 30 and a similar corresponding recess 100 is formed in the back panel 32 to allow the face pack 26 to pivot outwardly from the inner door 24. A clearance area 102 is formed in the edge of the inner door 24.

Figure 21:
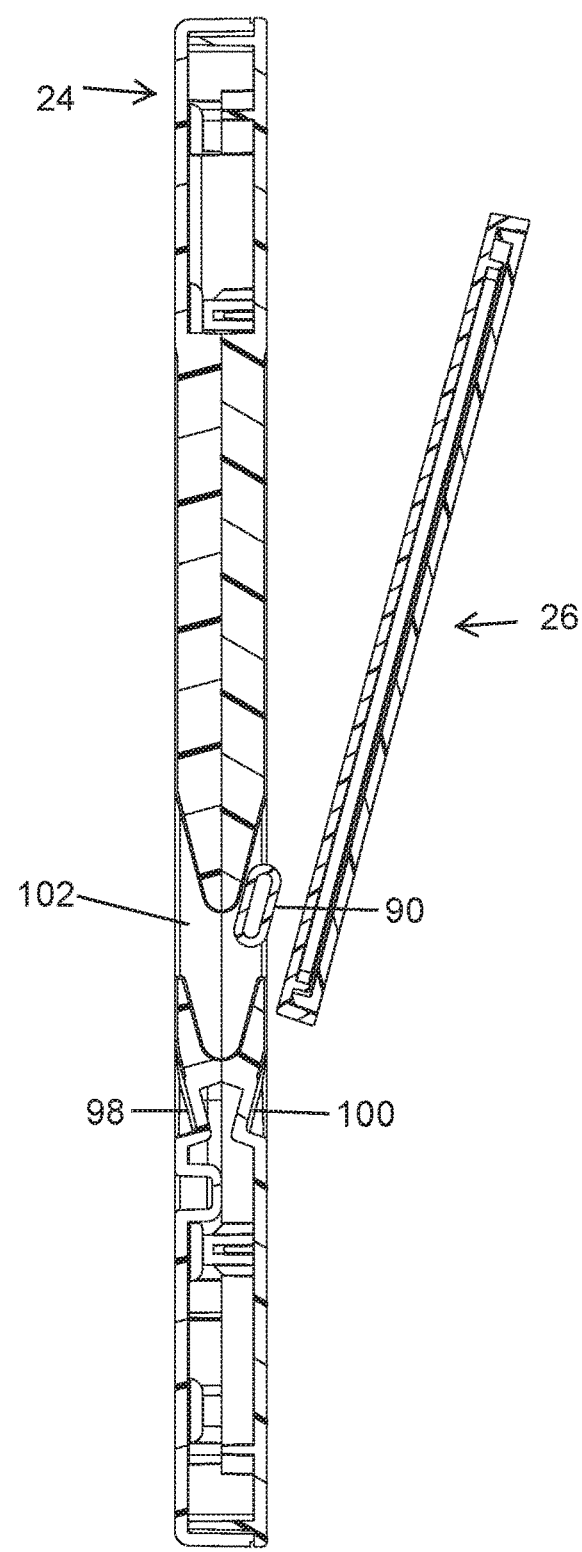
FIG. 21 is view of section AA in FIG. 16 with the face pack removed from the back side of the inner door, according to certain embodiments.

As illustrated in FIG. 21, the locating bar 90 can exit from the clearance areas 102 in the inner door 24 to allow a user to lift the face pack 26 away from the inner door 24. This procedure is reversed to install the face pack 26 into either side of the inner door 24. When a user needs to move the face pack 26 from one side of the inner door 24 to the other, the face pack 26 can pass through the opening 104 in the inner door 24. Passing the face pack 26 through the opening 104 allows the user to transfer the face pack 26 to a different location without disconnecting the power and communications cable.

Figure 22:
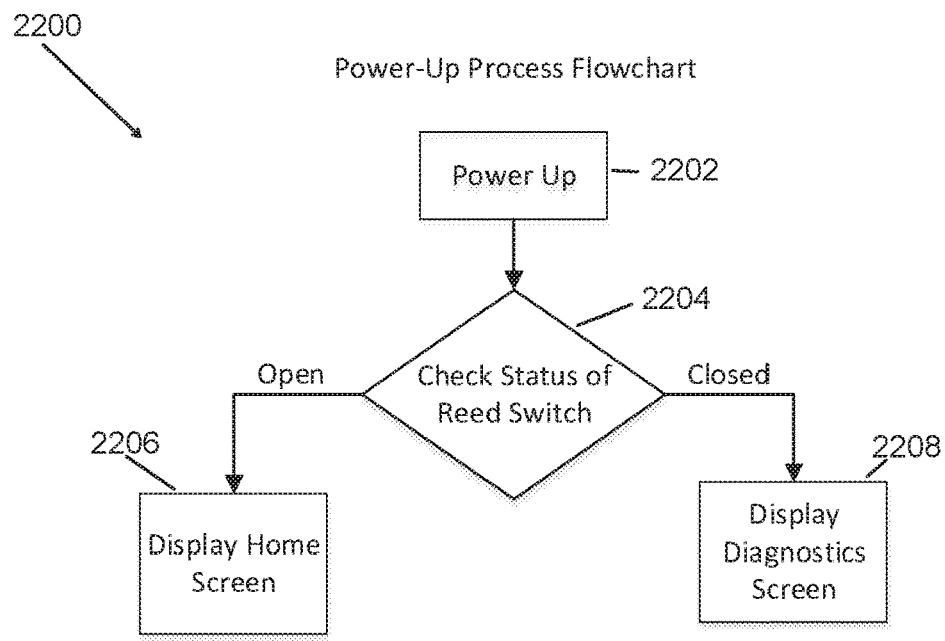
FIG. 22 is an exemplary flow chart illustrating which screen to display upon startup, according to certain embodiments.
Figure 23:
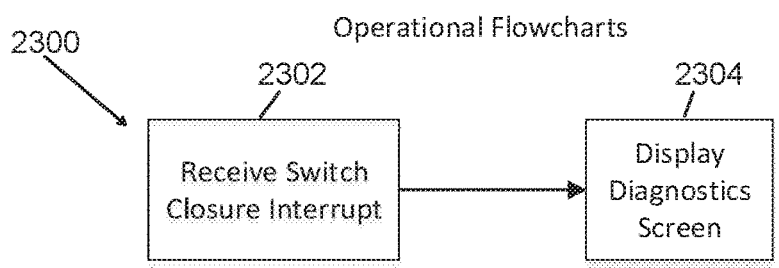
FIGS. 23 and 24 are exemplary flow charts illustrating which screen to display when the face pack is moved to a different mounting location, according to certain embodiments.
Figure 24:
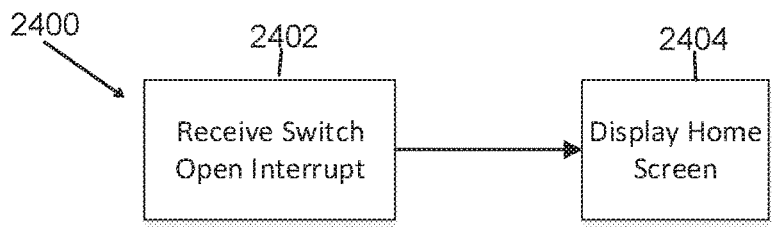

FIGS. 22-24 are exemplary flow charts showing the effects of the reed switch positions. FIG. 22 illustrates an exemplary power-up process 2200. The process 2200 begins at step 2202 when the irrigation controller 10 is powered up.

At step 2204, the process 2200 checks the status of the reed switch 88. In an embodiment, the face pack microcontroller 3202 reads the state of the reed switch 88 at step 2204. The state of the reed switch 88 is either open or closed. Depending on the configuration of the reed switch 88, the open state comprises one of the actuated state and the unactuated state and the closed state comprises the other of the actuated state and the unactuated state.

When the state of the reed switch 88 is open, the process 2200 moves to step 2206, where a screen, such as a home screen, comprising operational information for the irrigation controller 10 is displayed on display 42. When the state of the reed switch 88 is closed, the process 2200 moves to step 2208, where a diagnostics screen comprising diagnostic information for the irrigation controller 10 is displayed on display 42.

In other embodiments, the home screen can be displayed when the state of the reed switch 88 is closed and the diagnostic screens can be displayed when the state of the reed switch 88 is open.

FIGS. 23 and 24 illustrate exemplary operational processes 2300 and 2400, respectively. Referring to FIG. 23, the process 2300 at step 2302 detects a closure of the reed switch 88. In an embodiment, the closure of the reed switch 88 causes an interrupt to be sent to the face pack microprocessor 3202 that indicates the closure of the reed switch 88. At step 2304, the process 2300 displays one or more diagnostic screens in response to the closure of the reed switch 88. In an embodiment, the face pack microprocessor 3202 initiates the display of the diagnostic screens in response to the interrupt.

Referring to FIG. 24, the process 2400 at step 2402 detects an opening of the reed switch 88. In an embodiment, the opening of the reed switch 88 causes an interrupt to be sent to the face pack microprocessor 3202 that indicates the opening of the reed switch 88. At step 2404, the process 2400 displays one or more screens comprising operational information, such as a home screen in response to the opening of the reed switch 88. In an embodiment, the face pack microprocessor 3202 initiates the display of the operational information in response to the interrupt.

FIG. 25 illustrates an exemplary home screen 2500 for an irrigation program that may be viewed on the display 42. Many configurations of the home screen 2500 may be developed with different information displayed in different locations.

FIGS. 26-30 illustrate exemplary diagnostic screens that may be viewed by a user. FIG. 26 comprises an exemplary module information screen 2600; FIG. 27 comprises an exemplary click sensor diagnostics screen 2700; FIG. 28 comprises a flow sensor diagnostics screen 2800; FIG. 29 comprises a solar sync diagnostics screen 2900; and FIG. 30 comprises a station-Pump/Master Valve diagnostics screen 3000. Many configurations of diagnostic screens may be developed with different information displayed in different locations.

Any screen 2500-3000 may contain information to indicate the function of the user buttons 34-40 (FIG. 2) that are positioned next to the display 42. The function of one or more of the buttons 34-40 may change based on the information viewed on the display 42.

In one embodiment of the irrigation controller 10, a user may be able to set up daylight savings times manually. In many parts of the world, daylight savings time dates and times differ based on local rules. In one embodiment, a data screen may guide a user to manually enter the parameters necessary to enable daylight savings time change in the irrigation controller 10 to match the local area where the irrigation controller 10 is being used. FIG. 31 illustrates an embodiment of a data screen 3100 that includes at least one variable field for a user to manually enter information into one or more fields. The user may enter information such as the day of the month that daylight savings starts, the month of the year that daylight savings starts, the day of the month that daylight savings ends, or the month of the year that daylight savings ends.

Figure 32:
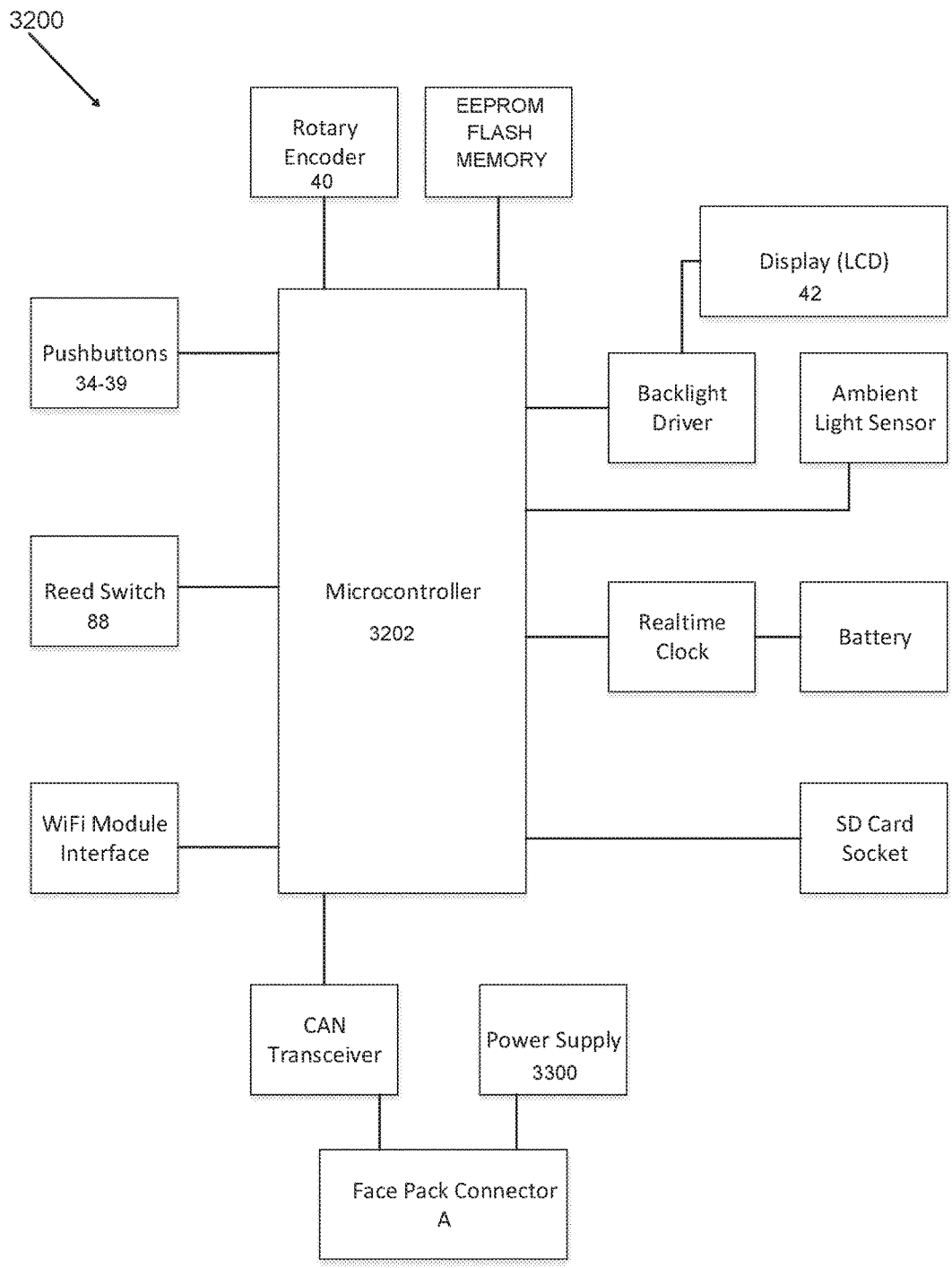
FIG. 32 is a block diagram illustrating an exemplary face pack, according to certain embodiments.

FIGS. 32, 33A, and 33B illustrate exemplary block diagrams of the basic circuitry of an embodiment of the irrigation controller 10 comprising the removable face pack 26. FIG. 32 is a block diagram of circuitry 3200 of an embodiment of the removable face pack 26 of the irrigation controller 10 of FIG. 2. The circuitry 3200 comprises the push button switches 34, 35, 36, 37, 38, 39, the rotary push button switch 40, the display 42, a backlight driver for the display 42, the reed switch 88, and the face pack microcontroller 3202. The circuitry 3200 further comprises memory, such as EEPROM, flash memory, ROM, RAM, or the like, an ambient light sensor, a real time clock, a battery, a secure digital (SD) card socket, a WiFi module, a first controller area network (CAN) transceiver, a power supply 3300, and a face pack connector A.

FIG. 33A is a block diagram of an exemplary power supply 3300 of the irrigation controller 10 of FIG. 2. The power supply 3300 comprises a power supply printed circuit board that includes a second controller area network (CAN) transceiver, a power supply microcontroller, power conditioning electronics, sensor conditioning electronics, and current sensing electronics. The power supply 3300 further comprises a face pack connector B which is configured to mate via a face pack cable (not illustrated) with the face pack connector A, a back plane power connector A, a back plane signal connector A, an AC power connection, a SyncPort™ connector, and inputs for user I/O, pump/master valves, and sensors.

FIG. 33B is a block diagram of an exemplary embodiment 3350 of the lower back plane 106 and the upper back plane 108 of the irrigation controller 10 of FIG. 2. The lower back plane 106 comprises the output module connections 50a-50f, flow expansion module connection 50g, a back plane power connector B which is configured to mate with the back plane power connector A, a back plane signal connector B which is configured to mate with the back plane signal connector A, a first slide lock switch, and a remote control connector. The upper back plane 108 comprises the output module connections 50h-50j and a second slide lock switch. The lower back plane 106 is in communication with the upper back plane 108 through power wires and I/O wires.

Figure 34:
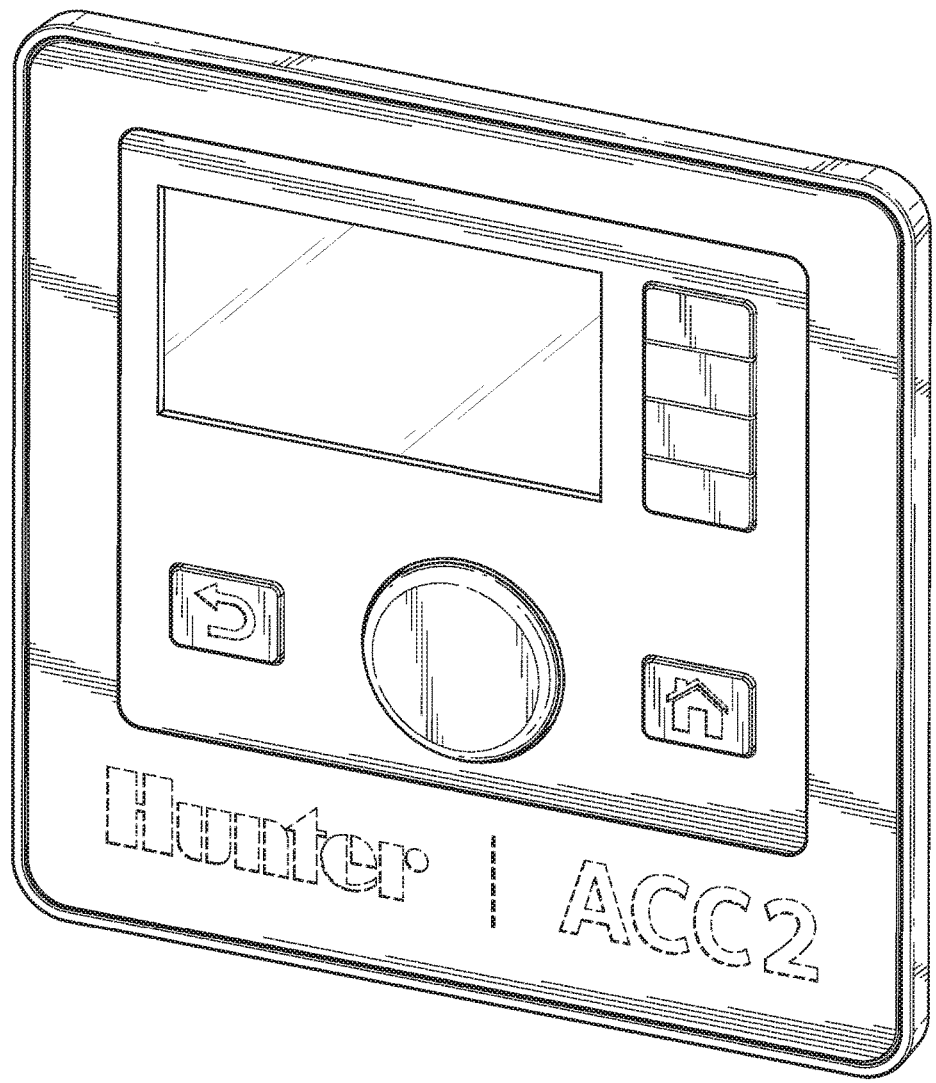
FIGS. 34-41 are exemplary views of the design of the face pack, according to certain embodiments.
Figure 35:
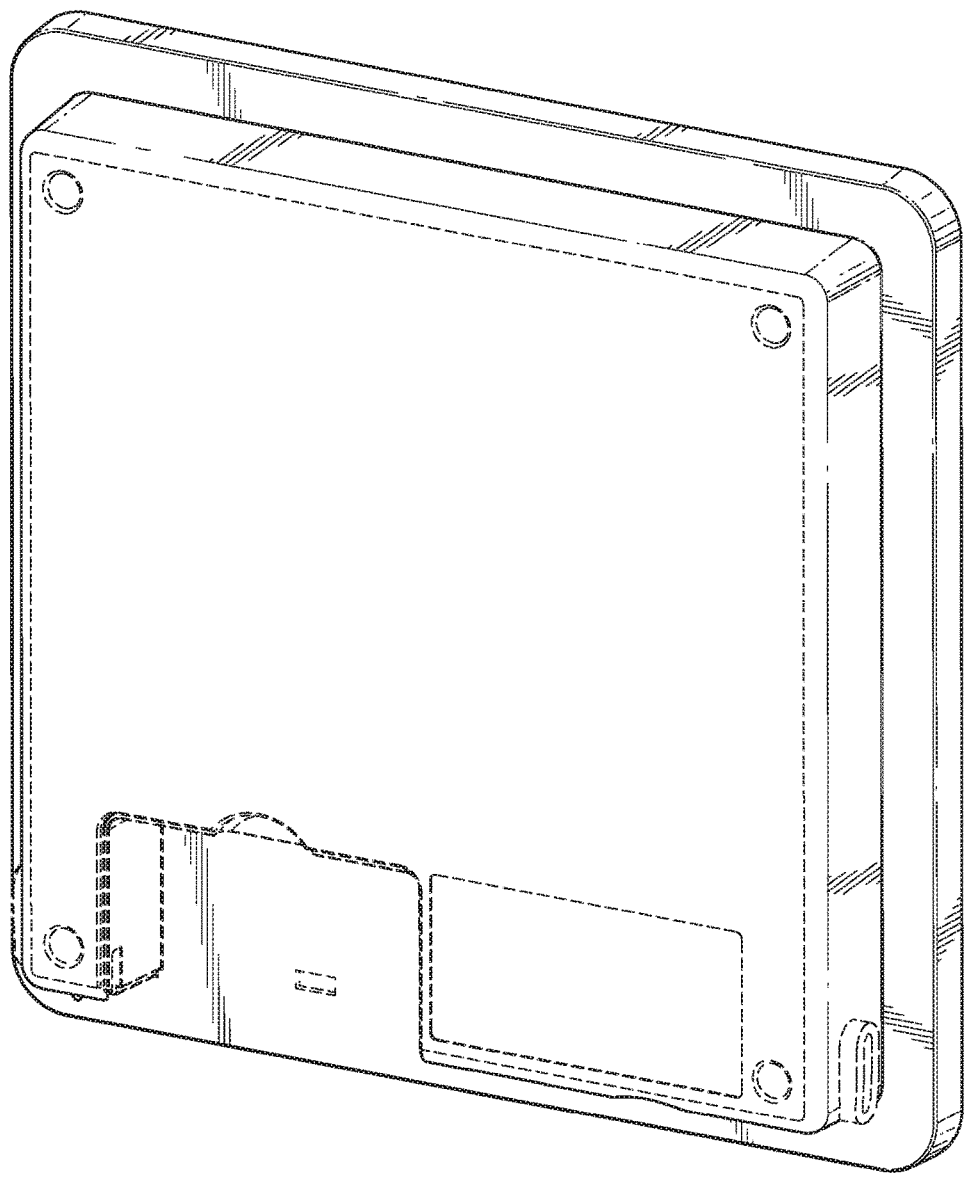
Figure 36:
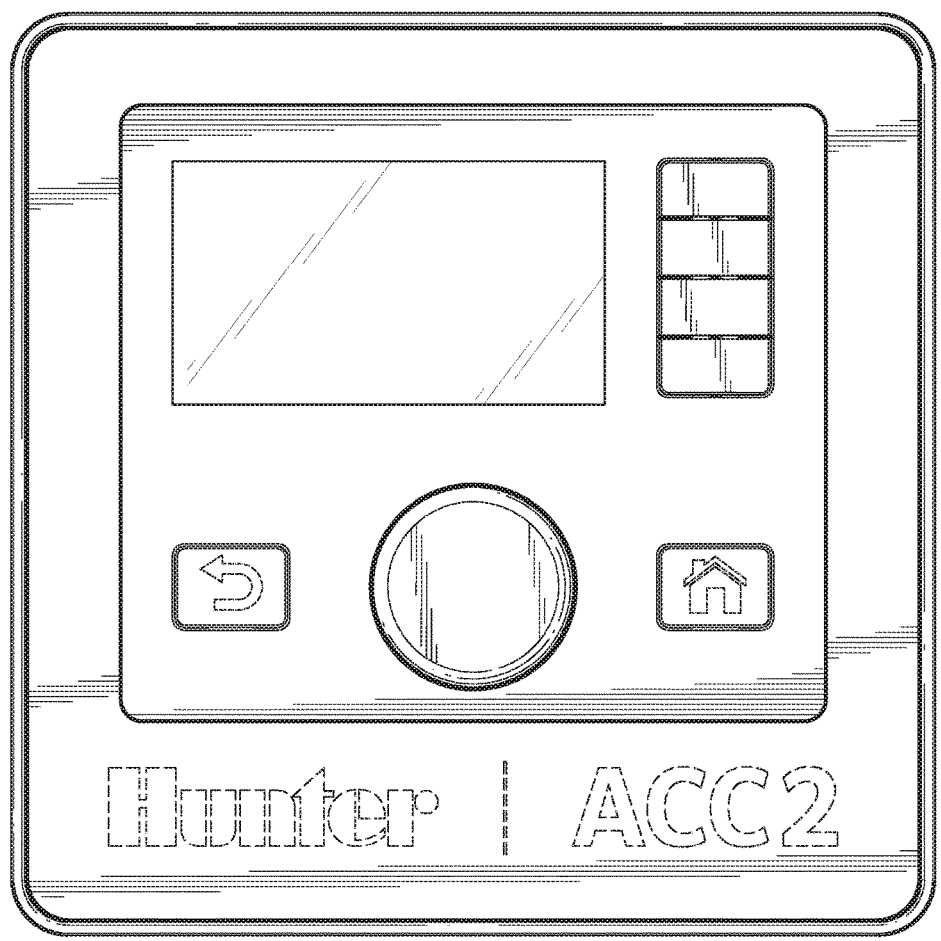
Figure 37:
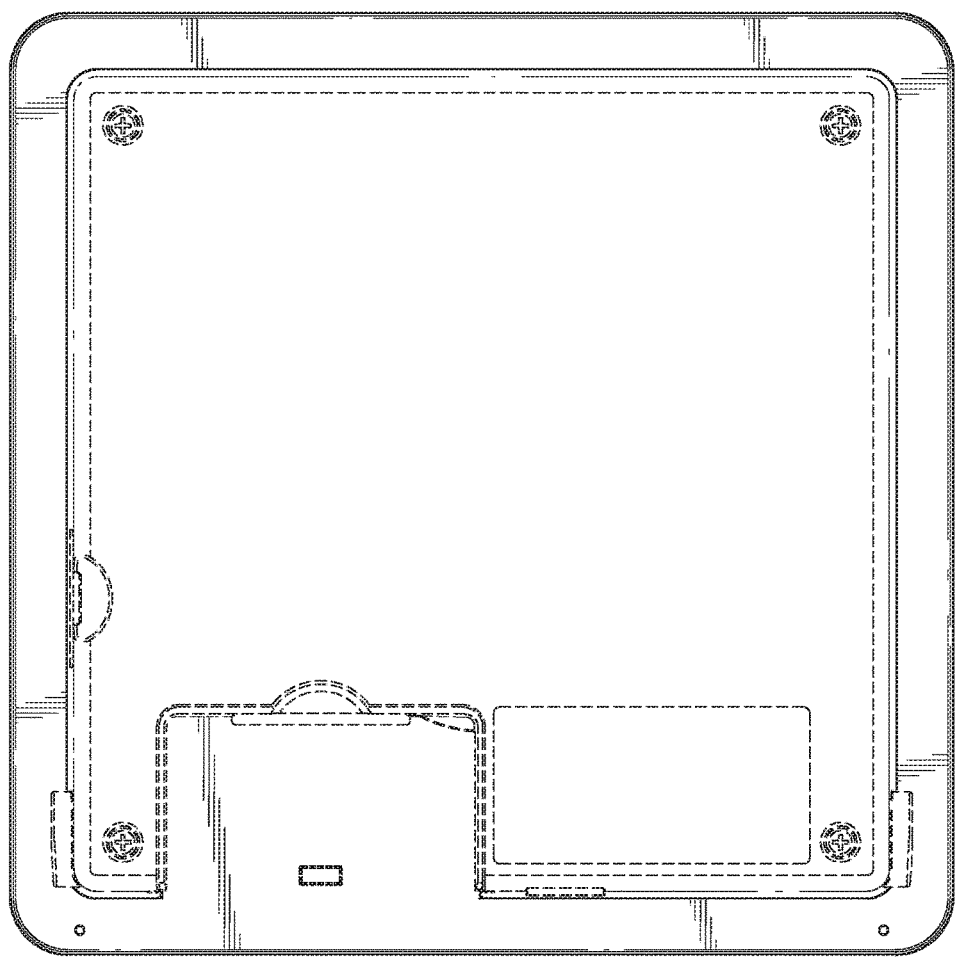
Figure 38:
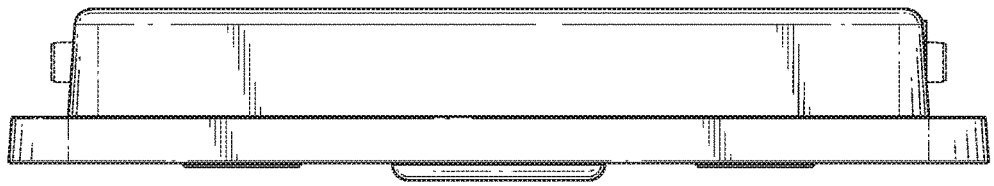
Figure 39:
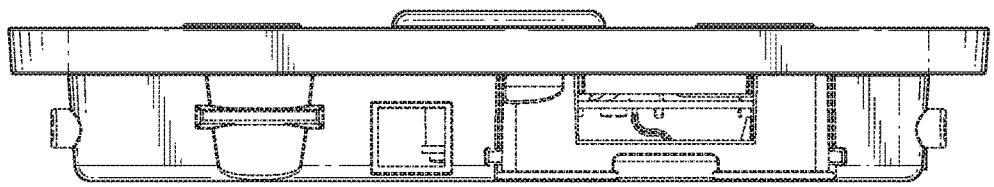
Figure 40:
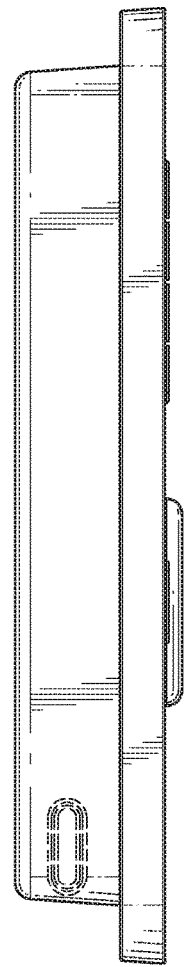
Figure 41:
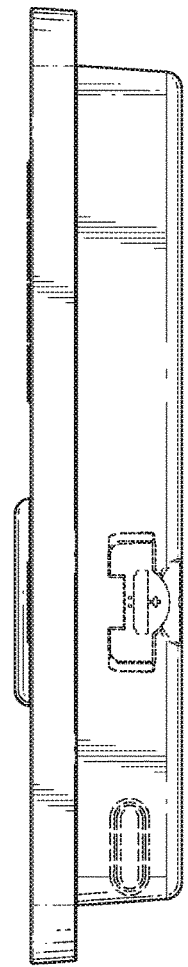

FIGS. 34-41 illustrate exemplary views of the design of the face pack 26 of the irrigation controller 10 of FIG. 2. FIG. 34 is an exemplary front perspective view and FIG. 35 is an exemplary rear perspective view. FIG. 36 is an exemplary front elevational view and FIG. 37 is an exemplary rear elevational view. FIG. 38 is an exemplary top plan view and FIG. 39 is an exemplary bottom plan view. FIG. 40 is an exemplary left-side elevational view and FIG. 41 is an exemplary right-side elevational view.

Additional Embodiments

In another embodiment, the face pack is attached to a hinged section of the inner door via a rotating hub. The rotating hub permits the face pack to be flipped top to bottom about a horizontal axis of the inner door. The manually actuable controls and the display are viewable when the face pack is positioned on the front side of the inner door and viewable after the face pack is rotated about the rotating hub and positioned on the back side of the open inner door.

Figure 42:
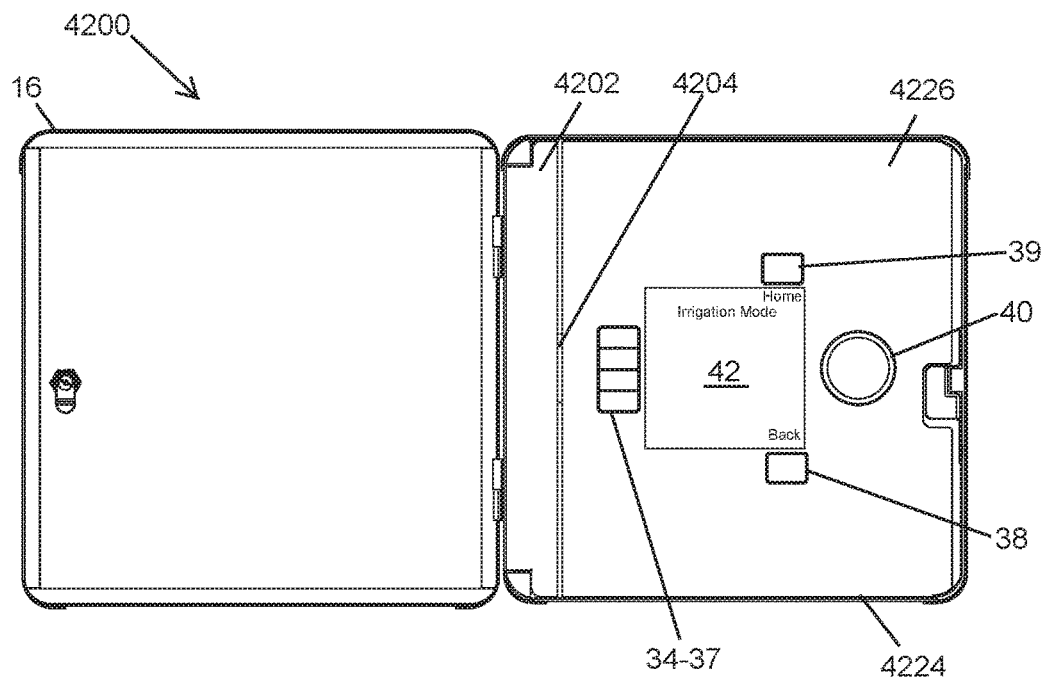
FIG. 42 illustrates an irrigation controller with the front door open to show a face pack mounted to the front side of an inner door, according to certain embodiments.

FIG. 42 illustrates an irrigation controller 4200 with the front door 16 open to show a face pack 4226 mounted to the front side of an inner door 4224. In an embodiment, the face pack 4226 comprises the plurality of manually actuable controls including push button switches 34, 35, 36, 37, 38 and 39 and the rotary push button switch 40, and the display 42, as described above.

In an embodiment, the inner door 4224 comprises the face pack 4226, a hinged section 4202, and a rotating hub 4204. The hinged section 4202 permits the inner door 4224 to move from a closed position, as illustrated in FIG. 42, to an open position that exposes the back panel 20 of the irrigation controller 4200. The rotating hub 4204 attaches the face pack 4226 to the hinged section 4202 of the inner door 4224. In addition, the face pack 4226 rotates about the rotating hub 4204 to move from a first position on the front side of the inner door 4224 to a second position on the back side of the open inner door 4224. The plurality of manually actionable controls 34-40 and the display 42 are viewable in the first position and the second position.

Figure 43:
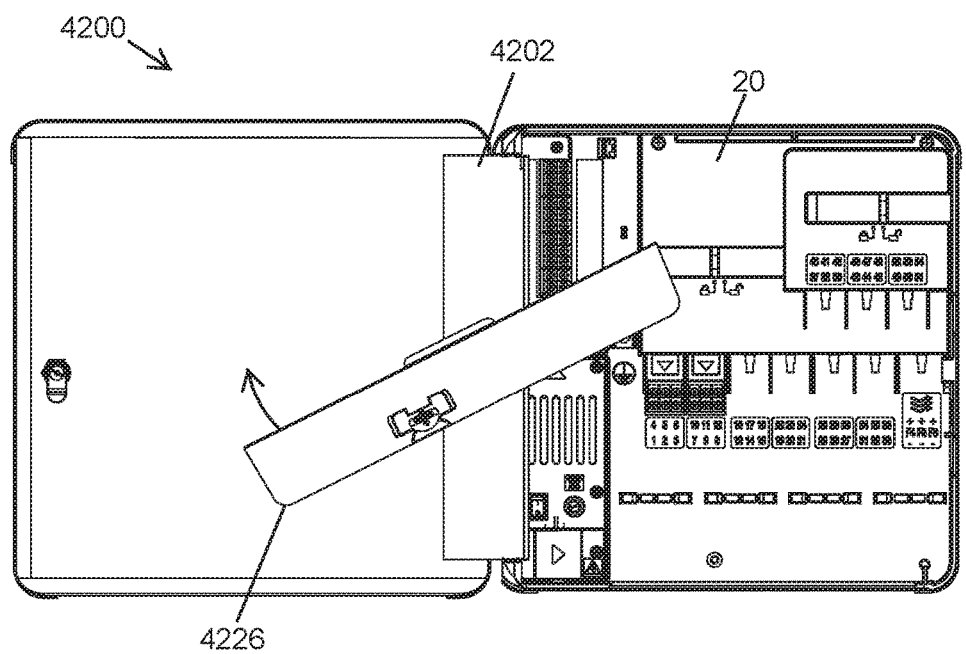
FIG. 43 illustrates the irrigation controller of FIG. 42 with the inner door partially open and showing the face pack partially rotated from the front side of the inner door, according to certain embodiments.
Figure 44:
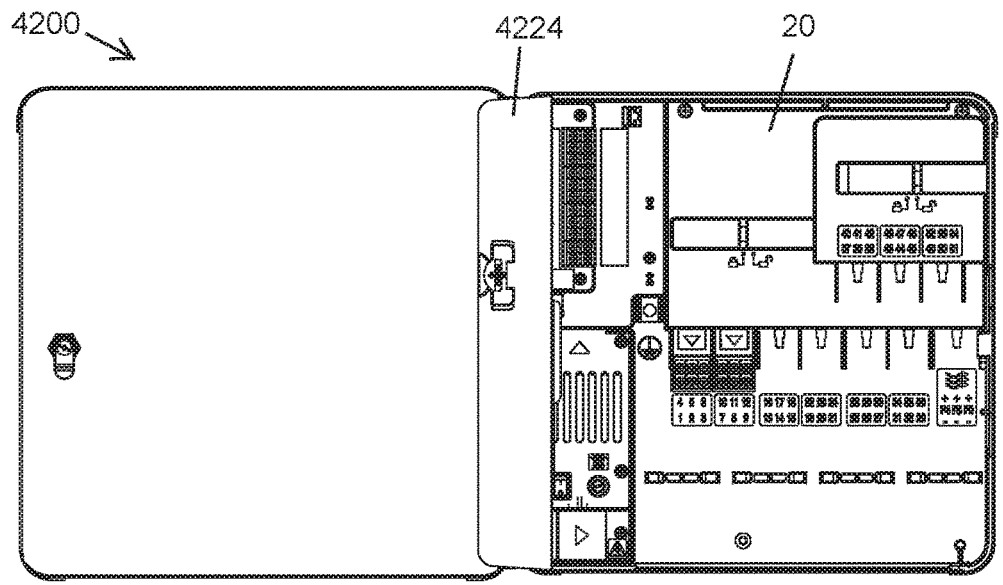
FIG. 44 illustrates the irrigation controller of FIG. 42 with the inner door partially open and showing the face pack rotated approximately 180° from the front side of the inner door, according to certain embodiments.

FIG. 43 illustrates the irrigation controller 4200 with the inner door 4224 partially open exposing the back panel 20 and showing the face pack 4226 partially rotated about the rotating hub 4202 and FIG. 44 illustrates the irrigation controller 4200 with the inner door 4224 partially open (approximately half way open) and showing the face pack 4226 rotated approximately 180° from the front side of the inner door 4224.

Figure 45:
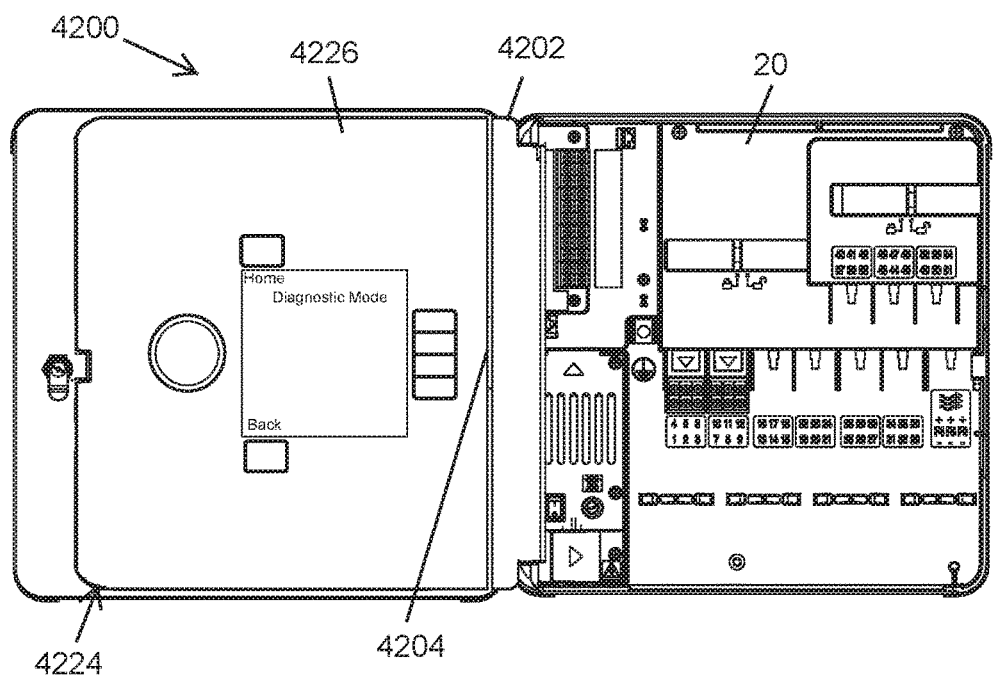
FIG. 45 illustrates the irrigation controller of FIG. 42 with the inner door open and showing the face pack mounted to the back side of the inner door, according to certain embodiments.

FIG. 45 illustrates the irrigation controller 4200 with the inner door 4224 open and showing the face pack 4226 positioned on the back side of the inner door 4224 with the switches 34-40 and the display 42 viewable. Because the face pack 4226 has been rotated approximately 180° and the inner door 4224 has been moved to an open position to expose the back panel 20, the switches 34-40 and the display 42 are reversed left to right, as illustrated in FIGS. 42 and 45. In an embodiment, a seal is positioned between the hinged section 4202 and the face pack 4226 to prevent water intrusion through the inner door 4224.

In an embodiment, the inner door 4224 comprises the switch activation magnet 86 and the face pack 4226 comprises the magnetically actuating device 88 as described above. The switch activation magnet 86 actuates and un-actuates the magnetically actuating device 88 depending on the proximity of the switch activation magnet 86 to the magnetically actuating device 88. In an embodiment, the actuation of the magnetically actuating device 88 causes the face pack microprocessor to receive an interrupt. In an embodiment, the face pack 4226 may comprise a positioning sensor such as a tilt switch TM1000Q from E-Switch or an inclinometer SCA61T-FA1H1G-6 from Murata Electronics North America, or any other switch that is configured to sense the position of the rotating face pack without the use of a separate magnet. The face pack 4226 comprises an irrigation mode when the inner door 4224 is closed and comprises a diagnostic mode when the inner door is open to expose the back panel 20.

When the face pack 4226 is in the irrigation mode, the switches 34-40 are configured to use in irrigation operations and the face pack 4226 displays on the display 42 operational screens. When the face pack 4226 is in the diagnostic mode, the switches 34-40 are configured for use in trouble shooting or other diagnostics and the face pack 4226 displays on the display 42 diagnostic screens. In an embodiment, diagnostic screens may also be viewable when the face pack 4226 is positioned on the front side of the inner door 4624. In an embodiment, operational screens may also be viewable when the face pack 4226 is positioned on the back side of the inner door 4624.

In another embodiment, the face pack comprises a touch screen and is attached to a hinged section of the inner door via a rotating hub. The rotating hub permits the touch screen face pack to be flipped top to bottom about a horizontal axis of the inner door. Advantageously, the switches and display are incorporated into the touch screen. As the touch screen face pack is rotated and moved from the front side of the inner door to the back side of the open inner door, the touch screen face pack automatically displays the switches and the display on the touch screen in the same orientation. Thus, the touch screen face pack automatically adjusts the orientation of the switches and the display with respect to the user so that the user views the switches and the display on the touch screen in the same orientation when the touch screen face pack is located on the front side or the back side of the inner door.

Figure 46:
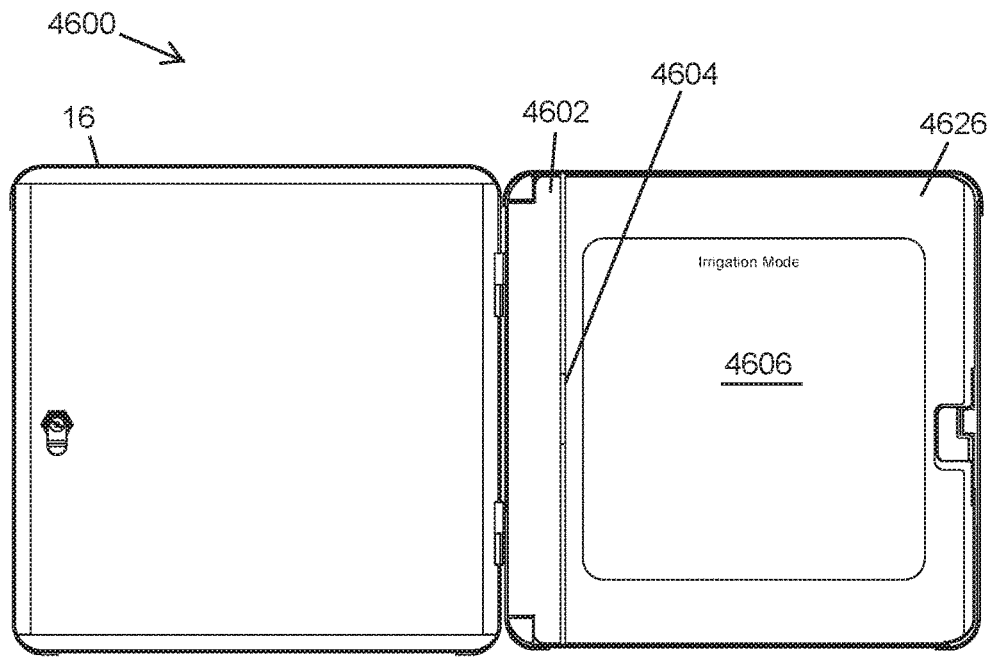
FIG. 46 illustrates an irrigation controller with the front door open to show a touch screen mounted to the front side of an inner door, according to certain embodiments.

FIG. 46 illustrates an irrigation controller 4600 with the front door 16 open to show a touch screen face pack 4626 comprising a touch screen 4606 mounted to the front side of an inner door 4624. In an embodiment, the touch screen 4606 is configured to display user controls corresponding to the push button switches 34, 35, 36, 37, 38 and 39 and the rotary push button switch 40 described above. The touch screen 4606 is further configured to function as the display 42, described above.

In an embodiment, the inner door 4624 comprises the touch screen face pack 4626, a hinged section 4602, and a rotating hub 4604. The hinged section 4602 permits the inner door 4624 to move from a closed position, as illustrated in FIG. 46, to an open position that exposes the back panel 20 of the irrigation controller 4600. The rotating hub 4604 attaches the touch screen face pack 4626 to the hinged section 4602 of the inner door 4624. In addition, the touch screen face pack 4626 rotates about the rotating hub 4604 to move from a first position on the front side of the inner door 4624 to a second position on the back side of the open inner door 4624. In an embodiment, a seal is positioned between the hinged section 4602 and the touch screen face pack 4626 to prevent water intrusion through the inner door 4224.

Figure 47:
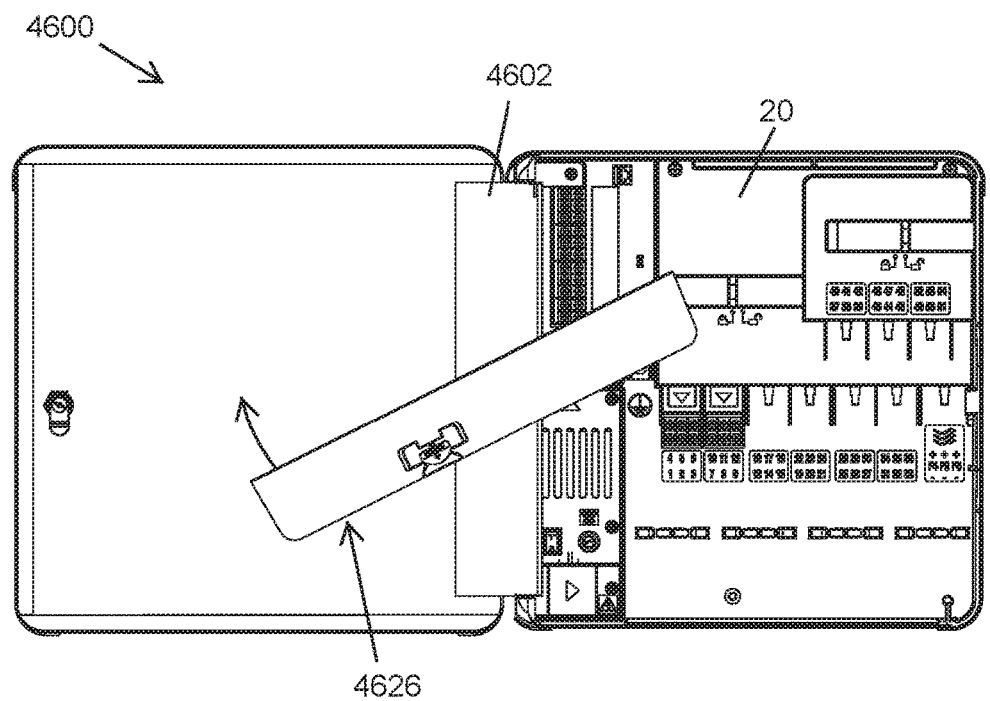
FIG. 47 illustrates the irrigation controller of FIG. 46 with the inner door partially open and showing the touch screen partially rotated from the front side of the inner door, according to certain embodiments.
Figure 48:
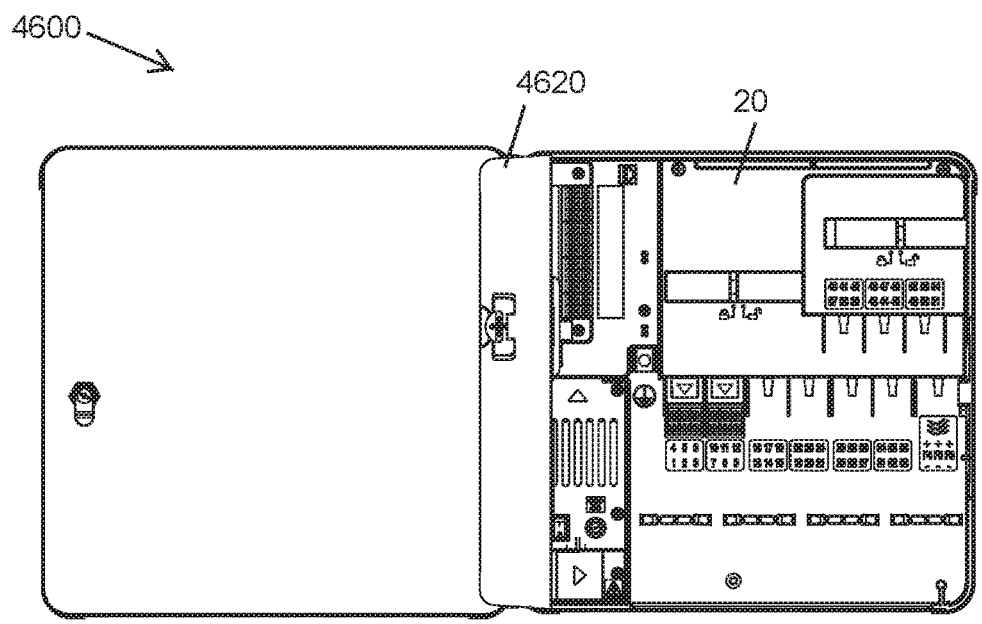
FIG. 48 illustrates the irrigation controller of FIG. 46 with the inner door partially open and showing the touch screen rotated approximately 180° from the front side of the inner door, according to certain embodiments.

FIG. 47 illustrates the irrigation controller 4600 with the inner door 4624 partially open exposing the back panel 20 and showing the touch screen face pack 4626 partially rotated from the front side of the inner door and FIG. 48 illustrates the irrigation controller 4600 with the inner door 4624 partially open (approximately half way open) and showing the touch screen face pack 4626 rotated approximately 180° from the front side of the inner door 4624.

Figure 49:
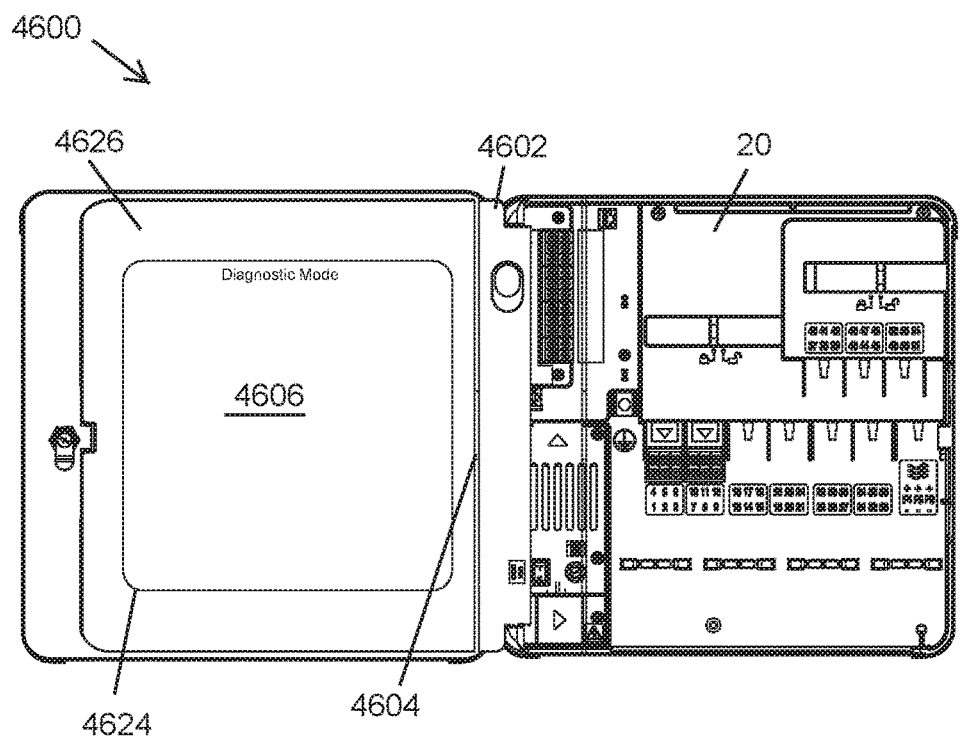
FIG. 49 illustrates the irrigation controller of FIG. 46 with the inner door open and showing the touch screen mounted to the back side of the inner door, according to certain embodiments.

FIG. 49 illustrates the irrigation controller 4600 with the inner door 4624 open and showing the touch screen face pack 4626 positioned on the back side of the open inner door 4624 with the touch screen 4606 viewable.

Even though the touch screen face pack 4626 has been rotated approximately 180° and positioned on the back side of the open inner door 4624, the touch screen 4606 can be configured to display the user controls, instructions, and feedback in the same orientation as displayed when the touch screen face pack 4626 is located on the front side of the closed inner door 4624.

In an embodiment, the inner door 4624 comprises the switch activation magnet 86 and the touch screen face pack 4626 comprises the magnetically actuating device 88, as described above. The switch activation magnet 86 actuates and un-actuates the magnetically actuating device 88 depending on the proximity of the switch activation magnet 86 to the magnetically actuating device 88 such that the touch screen face pack 4626 comprises an irrigation mode when the inner door 4624 is closed and comprises a diagnostic mode when the inner door 4624 is open to expose the back plane 20. In an embodiment, the face pack 4626 may comprise a positioning sensor such as a tilt switch TM1000Q from E-Switch or an inclinometer SCA61T-FA1H1G-6 from Murata Electronics North America, or any other switch that is configured to sense the position of the rotating face pack without the use of a separate magnet.

When the touch screen face pack 4626 is in the irrigation mode, the touch screen 4606 is configured for use in irrigation operations and displays operational screens. When the touch screen face pack 4226 is in the diagnostic mode, the touch screen 4606 is configured for use in trouble shooting or other diagnostics and displays diagnostic screens. In an embodiment, diagnostic screens may also be viewable when the touch screen face pack 4626 is positioned on the front side of the inner door 4624. In an embodiment, operational screens may also be viewable when the touch screen face pack 4626 is positioned on the back side of the inner door 4624. In another embodiment, (not illustrated), the face pack is attached to a hinged section of the inner door via a rotating hub. The rotating hub permits the face pack to be flipped back and forth about a vertical axis of the inner door. The manually actuable controls and the display, or a touch screen display, are viewable when the face pack is positioned on the front side of the inner door and viewable after the face pack is rotated about the rotating hub and positioned on the back side of the open inner door.

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding whether these features, elements, and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An irrigation controller to control an irrigation system, the irrigation controller comprising:
    a face pack comprising one or more actuable controls configured to enable a user to enter or select a watering program and at least one display configured to display instructions and feedback to program and maintain the irrigation system, the one or more actuable controls and the at least one display located on a front surface of the face pack; and
    an interior door that is configured to cover a wiring hookup area, the interior door further configured to rotate on a hinge to expose the wiring hookup area, the face pack being removably mounted onto the interior door;
    the face pack configured to be placed in a first orientation relative to an opening in the interior door when the wiring hookup area is covered, the front surface viewable when the face pack is in the first orientation;
    the face pack further configured to be passed through the opening in the interior door and placed in a second orientation relative to the opening in the interior door when the wiring hookup area is exposed, the front surface viewable when the face pack is in the second orientation;
    the face pack further configured to maintain electrical communication between the face pack and the irrigation controller when the face pack in one of the first and second orientations is passed through the opening in the interior door and placed in the other of the first and second orientations.

2. The irrigation controller of claim 1 further comprising:
    memory configured to store the watering program; and
    a processor operatively connected to the memory, the one or more actuable controls, and the at least one display, the processor configured to execute programming stored in the memory, receive user inputs from the one or more actuable controls, and provide a plurality of display screens having the instructions and the feedback.

3. The irrigation controller of claim 2 wherein the processor is further configured to provide a home screen to the at least one display when the face pack is in the first orientation and to provide a diagnostic screen to the at least one display when the face pack is in the second orientation.

4. The irrigation controller of claim 1 wherein the interior door comprises a magnet and the face pack further comprises a magnetically actuating device having a first state and a second state.

5. The irrigation controller of claim 4 wherein the magnetically actuating device comprises a magnetically actuating switch, and the instructions and the feedback displayed on the at least one display are based on a position of the magnetically actuating switch.

6. The irrigation controller of claim 1 wherein the face pack further includes a locating feature and the interior door further includes a groove formed in an inner edge of the opening in the interior door, wherein the locating feature is configured to seat in the groove to hold at least a portion of the face pack within the opening in the interior door.

7. An irrigation controller to control an irrigation system, the irrigation controller comprising:
    a housing configured to house the irrigation controller, the housing comprising an interior door that is configured to rotate about an interior hinge;
    memory configured to store a watering program;
    a removable face pack comprising a plurality of manually actuable controls configured to permit a user to enter or select the watering program, the removable face pack further comprising at least one display configured to provide instructions and feedback for programming and maintaining the irrigation system; and
    a plurality of receptacles that are covered when the interior door is closed and exposed when the interior door is open, each receptacle of the plurality of receptacles configured to accept a corresponding output module that is enabled according to the watering program to permit a flow of water to an irrigation area;
    the removable face pack configured to be placed relative to an opening in the interior door in a first position on a front side of the interior door when the plurality of receptacles are covered, the removable face pack further configured to be passed through the opening in the interior door and placed relative to the opening in the interior door in a second position on a back side of the interior door when the plurality of receptacles are exposed, and
    the removable face pack further configured to display a user home screen providing irrigation control information on the at least one display when in the first position, the removable face pack further configured to display a system diagnostic screen providing diagnostic information associated with a configuration of the plurality of receptacles on the at least one display when in the second position.

8. The irrigation controller of claim 7 wherein the plurality of manually actuable controls and the at least one display are viewable to the user when the removable face pack is in the first and second positions.

9. The irrigation controller of claim 7 wherein the removable face pack further comprises a magnetically actuable device having an actuated state and an unactuated state, and the interior door comprises a magnet.

10. The irrigation controller of claim 9 wherein the removable face pack displays the user home screen when the magnetically actuable device is in one of the actuated state and the unactuated state, and displays the system diagnostic screen when the magnetically actuated device is in the other of the actuated state and the unactuated state.

11. The irrigation controller of claim 9 wherein the magnetically actuable device comprises a reed switch.

12. The irrigation controller of claim 7 wherein at least one of the plurality of manually actuable controls has a first function when the home screen is displayed and a second function different from the first function when the system diagnostic screen is displayed.

13. The irrigation controller of claim 7 wherein the housing further comprises a first edge having a first radiused portion and a front door that is configured to rotate in relation to the housing between an open position and a closed position, the front door comprising a second edge having a second radiused portion that fits over the first radiused portion when the front door is in the closed position.

14. The irrigation controller of claim 7 wherein the removable face pack is further configured to maintain electrical connection between the face pack and the irrigation controller when the face pack is passed through the opening in the interior door.

15. A method to interface with an irrigation controller, the method comprising:
receiving, with one or more computer processors comprising computer hardware, an indication indicating one of an operator interface device mounted to a front side of a moveable panel in the irrigation controller and the operator interface device mounted to a back side of the moveable panel, the operator interface device comprising one or more actuable controls configured to enable a user to enter or select a watering program and at least one display configured to display instructions and feedback to program and maintain an irrigation system, the one or more actuable controls and the at least one display located on a first side of the operator interface device, the operator interface device being repositionable relative to an opening in the moveable panel between the front side and the back side of the moveable panel by passing at least a portion of the operator interface device through the opening;
the first side of the operator interface device viewable to the user when the operator interface device is mounted to the front side of the moveable panel and viewable to the user when the operator interface device is mounted to the back side of the moveable panel, the operator interface displaying a home screen on the at least one display when the moveable panel covers a wiring hookup area and the operator interface device is mounted to the front side of the moveable panel, the home screen providing irrigation control information.

16. The method of claim 15 wherein the movable panel is configured to cover the wiring hookup area when in a closed position and configured to expose the wiring hookup area when in an open position.

17. The method of claim 15 further comprising actuating a magnetically actuable switch located in the operator interface device with a magnet located in the moveable panel when the wire hookup area is covered.

18. The method of claim 15 further comprising generating the indication based on a state of a magnetically actuable switch.

19. The method of claim 15 wherein the operator interface displays a diagnostic screen on the at least one display when the wiring hookup area is exposed and the operator interface device is mounted to the back side of the moveable panel, the diagnostic screen providing diagnostic information associated with a configuration of the wiring hookup area.

20. The method of claim 15 wherein the operator interface device maintains electrical communication with the irrigation controller when the at least a portion of the operator interface device is being passed through the opening.

* * * * *